United States Patent
Griffin et al.

(10) Patent No.: US 11,601,261 B1
(45) Date of Patent: *Mar. 7, 2023

(54) SECURE KEY EXCHANGE ELECTRONIC TRANSACTIONS

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/532,713

(22) Filed: Nov. 22, 2021

Related U.S. Application Data

(63) Continuation of application No. 16/840,826, filed on Apr. 6, 2020, now Pat. No. 11,184,158, which is a continuation of application No. 15/894,786, filed on Feb. 12, 2018, now Pat. No. 10,615,970, which is a continuation of application No. 15/811,789, filed on Nov. 14, 2017, now Pat. No. 10,615,969.

(60) Provisional application No. 62/457,707, filed on Feb. 10, 2017.

(51) Int. Cl.
   *H04L 9/08* (2006.01)
   *H04L 9/06* (2006.01)

(52) U.S. Cl.
   CPC ......... *H04L 9/0825* (2013.01); *H04L 9/0643* (2013.01); *H04L 9/0822* (2013.01); *H04L 9/0869* (2013.01); *H04L 9/0877* (2013.01); *H04L 9/0894* (2013.01)

(58) Field of Classification Search
   CPC ... H04L 9/0825; H04L 9/0643; H04L 9/0894; H04L 9/0822; H04L 9/0877; H04L 9/0869
   See application file for complete search history.

(56) References Cited

U.S. PATENT DOCUMENTS

| | | | |
|---|---|---|---|
| 6,996,722 B1 | 2/2006 | Fairman et al. | |
| 7,797,342 B2 | 9/2010 | Banks et al. | |
| 7,885,413 B2 | 2/2011 | Vasic et al. | |
| 8,340,299 B2 | 12/2012 | Buer et al. | |
| 8,638,934 B2 | 1/2014 | Deaver et al. | |
| 8,750,516 B2 | 6/2014 | Goodman et al. | |
| 8,813,247 B1 | 8/2014 | Alten | |
| 8,966,281 B1 | 2/2015 | Raizen et al. | |
| 9,137,658 B2 | 9/2015 | Kawamura et al. | |
| 9,158,933 B2 | 10/2015 | Banks et al. | |
| 9,288,044 B2 | 3/2016 | Spalka et al. | |
| 9,432,346 B2 | 8/2016 | Madden | |
| 9,660,970 B1 * | 5/2017 | Rubin | H04L 9/0825 |

(Continued)

OTHER PUBLICATIONS

Secure Automotive On-Board Protocols: A Case of Over-the-Air Firmware Updates, by Wolf et al., published 2011 (Year: 2011).*

*Primary Examiner* — Vu V Tran
(74) *Attorney, Agent, or Firm* — Foley & Lardner LLP

(57) ABSTRACT

A unique transaction key (Tk) is established amongst multiple entities using a common hardware security module (HSM) with a common HMAC key (HK) and transaction scheme name (T). The transaction key (Tk) can be used for various cryptographic functions (e.g. encryption, MAC, HMAC, key management) with one or more messages at the transaction or session level.

20 Claims, 10 Drawing Sheets

(56) References Cited

U.S. PATENT DOCUMENTS

| | | | |
|---|---|---|---|
| 10,693,638 B1* | 6/2020 | Cignetti | G06F 21/602 |
| 2013/0145160 A1 | 6/2013 | Bursell | |
| 2014/0087691 A1 | 3/2014 | Babbage et al. | |
| 2015/0026456 A1 | 1/2015 | Kim et al. | |
| 2015/0295713 A1* | 10/2015 | Oxford | H04L 9/0816 |
| | | | 713/171 |
| 2015/0304315 A1 | 10/2015 | Estehghari et al. | |
| 2016/0119318 A1* | 4/2016 | Zollinger | H04L 9/3228 |
| | | | 713/171 |
| 2017/0220624 A1 | 8/2017 | Gokavarapu et al. | |
| 2018/0082283 A1 | 3/2018 | Sharma | |
| 2020/0092096 A1 | 3/2020 | Lacouture et al. | |

* cited by examiner

SECURE KEY EXCHANGE ELECTRONIC TRANSACTIONS

CROSS-REFERENCE TO RELATED APPLICATIONS

The present application claims priority and is a continuation of U.S. patent application Ser. No. 16/840,826, filed on Apr. 6, 2020 which in turn claims priority and is a continuation of U.S. patent application Ser. No. 15/894,786, filed on Feb. 12, 2018, the contents of which is incorporated herein. The present application claims priority to U.S. patent application Ser. No. 15/811,789, filed on Nov. 14, 2017; it also claims priority to U.S. Patent Application No. 62/457,707, filed on Feb. 10, 2017, the contents of both of which are incorporated herein.

TECHNICAL FIELD

The present application relates generally to systems and methods for secure key exchange electronic transactions (SKEET).

BACKGROUND

Database encryption technologies protect files, tables, columns, rows, or individual cells within a database. Sensitive information (e.g., credit card numbers, social security numbers and other sensitive or personally identifiable information) is encrypted to prevent access by unauthorized entities. Data encryption is typically performed using cryptographic software modules but the cryptographic keys are better protected using cryptographic hardware modules, also known as hardware security modules (HSM). A hardware security module (HSM) is a physical computing device that safeguards and manages cryptographic keys used for cryptographic functions (e.g., data encryption, key encryption, message authentication codes, or digital signatures within the cryptographic boundary of the HSM). An HSM may be implemented in the form of a channel plug-in card, an external cabled device, or an external networked device that communicates securely to a computer or network server.

Transaction keys, used by various systems to securely exchange data, are difficult to establish and manage. Conventional key management systems include fixed key and master key/session key (including symmetric and asymmetric master keys). Each method requires that an initial key be established using various methods including key components, key shares, or asymmetric key transport or key agreement methods. An initial key must be established with each entity that is part of the data exchange transaction. If an entity is compromised, generating and installing a new key is labor-intensive. Typically, automatic teller machines have initial keys manually installed in the field, point of sale terminals have initial keys injected at a key loading facility, and network connections might use paper key components or asymmetric keys manually installed.

SUMMARY

Various embodiments relate to a method performed by a processor of a secure key exchange for electronic transactions (SKEET) system. In some embodiments, the method relates to managing transaction keys (Tk) without exporting or transmitting cleartext keys.

An example embodiment is a method for managing secure key exchange electronic transactions without transmitting cleartext keys. The method includes generating, by a hardware security module (HSM) key manager circuit of a database encryption key management system associated with an HSM, a master key encryption key for the HSM and an HMAC key. In some embodiments, the method includes encrypting, by the HSM key manager circuit, the HMAC key using the master key encryption key to generate an HMAC key cryptogram. In some embodiments, the method includes transmitting, by an HSM interface circuit, a first copy of the HMAC key cryptogram to an entity computing system. In some embodiments, the method includes directing, by the HSM key manager circuit, the entity computing system to store the first copy of the HMAC key cryptogram in a first non-volatile storage of the entity computing system, generate a first asymmetric key pair comprising a first public key and a first private key, store the first public key in the first non-volatile storage; and/or establish a transaction scheme. In some embodiments, the method includes receiving, by the HSM interface circuit from the entity computing system, the first copy of the HMAC key cryptogram, the transaction scheme, and the first public key. In some embodiments, the method includes decrypting, by the HSM key manager circuit, the HMAC key cryptogram to obtain the HMAC key. In some embodiments, the method includes generating, by the HSM key manager circuit, a seed using the HMAC key and the transaction scheme. In some embodiments, the method includes deleting, by the HSM key manager circuit, the transaction scheme from the local storage media associated with the HSM. In some embodiments, the method includes transmitting, by the HSM key manager circuit, the seed, the seed being cryptographically protected using the first public key, from the HSM to the entity computing system. In some embodiments, the method includes directing, by the HSM key manager circuit, the entity computing system to decrypt the seed; and/or derive a transaction key (Tk) using the seed. Advantageously, the entity computing system derives the Tk using the seed as an input to a key derivation algorithm (KDF). Advantageously, the entity computing system uses the Tk to cryptographically protect transactions of the transaction scheme.

These and other features, together with the organization and manner of operation thereof, will become apparent from the following detailed description when taken in conjunction with the accompanying drawings, wherein like elements have like numerals throughout the several drawings described below.

Figure 1:
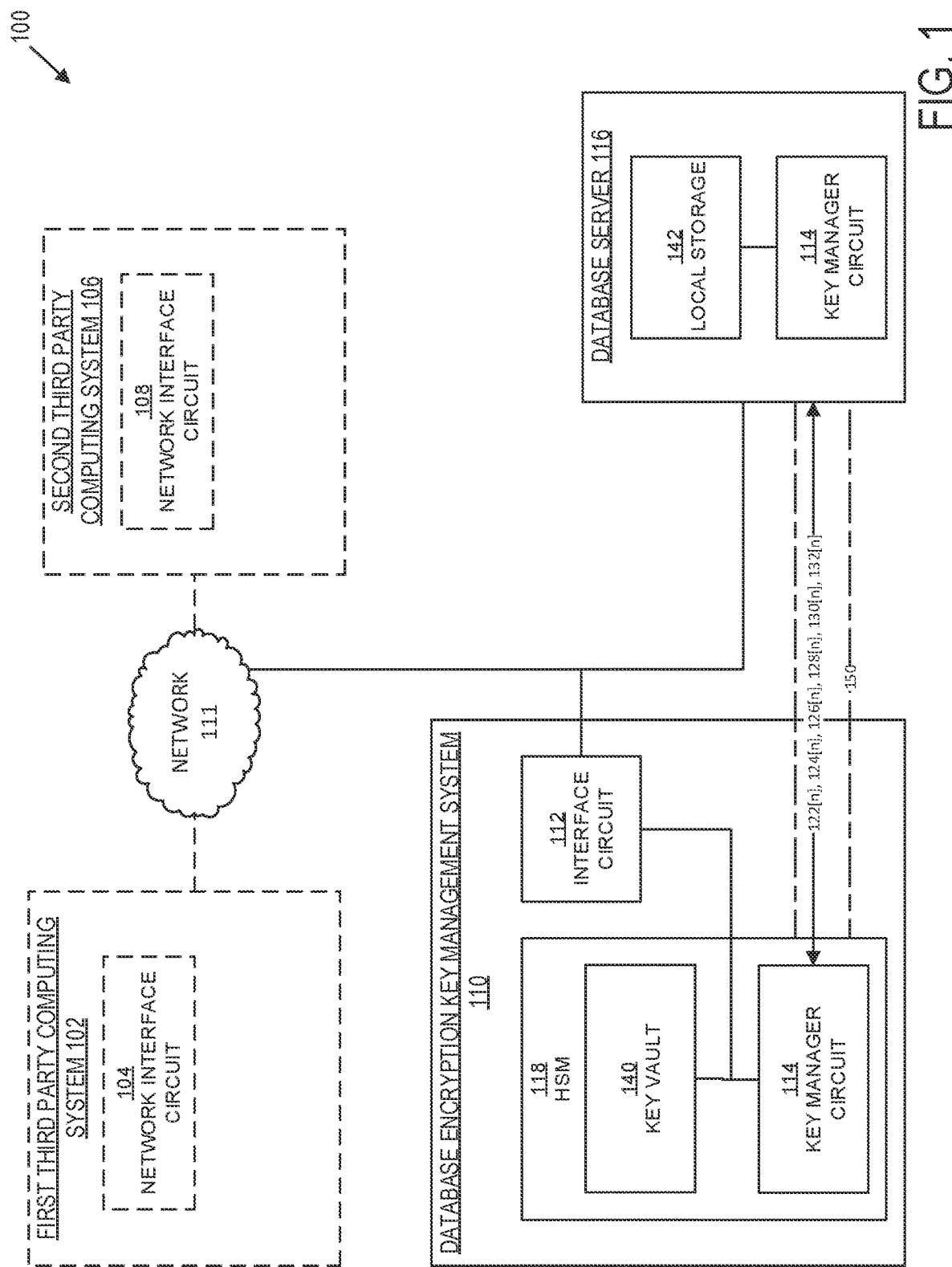
FIG. 1 is a component diagram of an electronic system comprising a database encryption key management system, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Conventionally, database encryption is typically done using cryptographic software modules on the database servers. Consequently, DEKs are kept in the database system memory and used with cryptographic software to encrypt and decrypt data. For secure key management reasons, the DEK cannot be stored as cleartext, which is easily compromised. Conventionally, a DEK may itself be encrypted using a key encryption key (KEK). However, encrypting the DEK with another key for local storage does not address the key management issue as the KEK must likewise be stored as cleartext somewhere. Using an HSM properly avoids this circular problem.

In some systems, an HSM is used with a KEK (or with a Tk), which can be a symmetric or asymmetric solution. The DEK/Tk is encrypted using the KEK, stored externally outside the HSM, and decrypted using the KEK within the HSM. However, exposing the DEK/Tk as cleartext outside the HSM violates a fundamental principle of cryptographic control: an HSM cannot knowingly export cleartext keys. Conventionally, this control is often averted by treating the DEK/Tk as a data element and spoofing the HSM as encrypting and decrypting data instead of an actual cryptographic key.

Conventionally, transactions between and among multiple parties are vulnerable to hacking even when they are encrypted because the encryption key (DEK/Tk) itself may be vulnerable to hacking as it is conventionally stored on disk. Advantageously, SKEET solves the internet-centric problem of transaction hacking via several improvements to conventional key management technology, which include key management without using permanent storage, enhanced audit, and "whitelisting" of parties who attempt to access transaction data. Individual data elements are encrypted using, for example, the DBESKM protocol described in an example embodiment in reference to FIG. 9. The DBESKM protocol confers numerous technical advantages, including enhanced security and audit capabilities for simplified management and tracking of cryptographically protected messages. For example, an HMAC key created using a hardware security module (HSM) is not permanently stored on any storage media associated with the HSM. Additionally, the HMAC key cryptogram (used as part of generating a key to encrypt data) is cryptographically protected with a reliable timestamp as a signed message using the private key of the HSM prior to being transmitted from the HSM to auxiliary systems through a secure connection. Furthermore, a party that wants to participate in a transaction must be "whitelisted" (verified as secure and/or authorized) before obtaining access to an encrypted seed generated by the HSM and used to generate the transaction key Tk. In some embodiments, the HSM will "whitelist" the party only if one of the holders of the Tk (such as one or more parties to the original transaction) approve the addition of the new member. This also facilitates later audit or discovery by parties that were not initially part of the transaction.

Referring to the figures generally, various embodiments described herein relate to a unique transaction key (Tk) that is established amongst multiple entities using a common hardware security module (HSM) with a common HMAC key (HK) and transaction scheme name (T). The transaction key (Tk) can be used for various cryptographic functions (e.g. encryption, MAC, HMAC, key management) with one or more messages at the transaction or session level.

FIG. 1 is a component diagram of an electronic system 100 comprising a database encryption key management system 110, according to an example embodiment. The database encryption key management system 110 includes an HSM 118 and a database server 116. The database encryption key management system 110 is structured so that the HSM 118 manages DEKs generated by the database server 116 without exporting cleartext keys. Exporting cleartext keys is a violation of a core tenet of cryptographic key management. According to various example embodiments, as described in further detail herein, systems and methods described herein provide a technical solution to the computer-centric and internet-centric problem of encrypting data for local storage with the use of an HSM without having to transmit cleartext keys between the HSM and the database server. The problem arises, in particular, in the context of data storage, especially when large volumes of data are stored and processed, because database encryption typically has too high data volumes for a cryptographic HSM itself to encrypt and decrypt the data. Therefore, conventional systems rely on software implemented outside both the HSM and the database server to manage the encryption process. However, this exposes encryption information, including encryption keys, to systems and entities outside the HSM and the database server. In the event these systems are hacked, an intruder may compromise the confidentiality of the data by obtaining unauthorized access to the keys managed via add-on encryption software. Advantageously, the systems and methods disclosed herein eliminate this problem because the master key manager circuit is implemented to structure communications between the database server and the HSM such that encryption keys are not stored locally or exposed outside the security boundaries of the system.

According to various embodiments, the HSM 118 generates a master key encryption key 122 and an HMAC key 124, which are never transmitted outside the HSM 118 and may be stored in a key vault 140 of the HSM 118. The HSM 118 encrypts the HMAC key 124 using the master key encryption key 122 to generate an HMAC cryptogram 126, which is transmitted to the database server 116. The database server 116 generates a unique identifier 128 and stores the HMAC cryptogram 126 and the unique identifier 128 in its local storage 142. In order to generate the DEK 130, the database server 116 transmits the HMAC cryptogram 126 and the unique identifier 128 to the HSM 118. The HSM 118 generates a seed 132 using the HMAC key 124 and the unique identifier 128, and transmits the seed 132 back to the database server 116. The seed 132 can be conceptualized as a shared secret between the HSM 118 and the database server 116. The database server 116 derives a DEK 130 using the seed 132 as an input to a key derivation algorithm. Accordingly, the database encryption key management system 110 enables secure database and/or transaction encryption key management without transmitting cleartext keys.

As shown in FIG. 1, the example configuration comprising the database encryption key management system 110 may be used to secure the content of a database on the database server 116 such that vulnerability of the database to external attacks, and the likelihood that the data stored therein would be compromised, are minimized. Additionally, in some embodiments, the system 100 may comprise a first third-party computing system 102, a second third-party computing system 106, and the database encryption key management system 110, each component being in operative communication with the others via a network 111. The network 111 is a telecommunications network of a suitable topology (e.g., the internet, intranet, peer-to-peer), using any suitable medium (e.g., wireless, fiber-optic, cellular, cable, telephone) and any suitable communications protocol (e.g., IEEE 802.x, Internet Protocol Suite, near-field communications).

Multiple parties, such as users of the first third-party computing system 102 and the second third-party computing system 106, submit requests for encrypted data, which they receive via the network 111. For example, the first party may be a first merchant that stores sensitive customer information, such as credit card numbers and security codes, on the database server 116, which, in this case, is associated with the first third-party computing system 102. This stored data may be associated with the HSM 118 and encrypted by the database server 116 using the DEK 130 as described further herein. In other embodiments, the second party that operates the second third-party computing system 106 may be a second merchant that stores another, separate data set containing sensitive information on a second HSM and/or a second database server (not shown) such that database servers are managed separately, as shown, for example, in FIG. 6B. Furthermore, the separately managed database servers may be managed by separate HSMs as shown, for example, in FIG. 6C.

In some embodiments, the database encryption key management system 110 comprises an interface circuit 112, a key manager circuit 114, the HSM 118, and the database server 116. The database server 116 may house a conventional data processing system, such as a database management system (DBMS) or a suitable alternative arrangement, including distributed arrangements and arrangements that are entirely software-based and where a conventional DBMS is omitted. As shown in FIG. 1, the HSM 118 is part of a database encryption key management system 110.

The interface circuit 112 is structured to facilitate operative communication between the database encryption key management system 110 and any of the first third-party computing system 102 and the second third-party computing system 106 via the network 111.

The key manager circuit 114 is structured to generate and manage various cryptographic keys, and to encrypt data elements using the cryptographic keys. In some embodiments, the key manager circuit 114 is structured to generate at least one master key encryption key 122 for storage in the HSM 118, generate at least one HMAC key 124 and at least one HMAC key cryptogram 126 for encryption performed by the database server 116, decrypt the HMAC key cryptogram 126 to generate a seed 132 after the HMAC key cryptogram 126 is processed by the database server 116, and provide the seed 132 to the database server 116 for creating a DEK 130.

The HSM 118 is structured to host the digital keys generated by the key manager circuit 114, including at least one master key encryption key 122, at least one HMAC key 124, and at least one HMAC key cryptogram 126. The HSM 118 contains the key vault 140 (e.g., a memory and/or a permanent storage module), in which the master key encryption key 122 and the HMAC key 124 are stored. In some implementations, multiple HSMs 118 may be included as described, for example, in reference to FIG. 6C. Each of these HSMs 118 may have its own key manager circuit 114, or multiple HSMs 118 may share a key manager circuit 114.

The database server 116 is communicatively coupled to the key manager circuit 114 via a secure connection 150. In some embodiments, the secure connection 150 is a Transport Layer Security (TLS) protocol-based electronic connection. In some embodiments, the secure connection 150 is a Transport Layer Security (TLS) protocol-based electronic connection. In other embodiments, the secure connection 150 is an Internet Protocol Security (IPsec)-based connection. Additionally or alternatively, the secure connection 150 may be established using a mutual authentication algorithm comprising digital certificates. After the secure connection 150 is established, the key manager circuit 114 transmits at least the HMAC cryptogram 126 to the database server 116. The database server 116 may reside at least in part on a mobile device, such that a public encryption key is securely distributed to the mobile device, and/or on an internet-of-things (IoT) device, such that that a public encryption key is securely distributed to the IoT device.

The database server 116 is structured to generate and store a unique identifier 128 that corresponds to the HMAC key 124 and/or the HMAC key cryptogram 126 provided by the key manager circuit 114. The database server 116 is also structured to provide a DEK 130, generated based at least on the seed 132 received from the key manager circuit 114. As described, for example, with reference to FIG. 4-6C, multiple DEKs may be used in a key management structure by, for example, managing multiple unique identifiers 128 using the same HMAC key 124 with the same master key encryption key 122.

The DBKEM schema and various components thereof (in particular, the key manager circuit 114) may be implemented using a suitable programming language. An example definitional framework for the key manager circuit 114 is provided below.

```
DbEKM {
    iso(1) identified-organization(3) tc68(133) country(16)
        x9(840) x9Standards (9) x9-73(73) module(0)
        dbekm(9)}
DEFINITIONS AUTOMATIC TAGS::=BEGIN
--EXPORTS All--
IMPORTS
--X9.73 Cryptographic Message Syntax (CMS)--
AlgorithmIdentifier { }, ALGORITHM, ATTRIBUTE,
    Attribute { },
KEY-MANAGEMENT, MessageAuthenticationCodeAl-
    gorithm
FROM CryptographicMessageSyntax{
    iso(1) identified-organization(3) tc68(133) country(16)
        x9 (840)
    x9Standards(9) x9-73(73) module(0) cms(2) v2009(1)}
--X9.73 CMS Object Identifiers--
id-dbekm-recip-info, id-SimpleString, id-UniqueIdenti-
    fier FROM CMSObjectIdentifers{
    iso(1) identified-organization(3) tc68(133) country(16)
        x9 (840)
    x9Standards(9) x9-73(73) module(0) oids(1) v2009(1)
    };
--X9.73 XML namepace: urn:oid:1.3.133.16.840.9.73--
DB-Encryption-Key-Management     KEY-MANAGE-
    MENT::={
    dbekmRecipientInfo,
    . . . --Expect additional key management objects--
}
dbekmRecipientInfo KEY-MANAGEMENT::=
    {DBEKMRecipientInfo IDENTIFIED BY id-dbekm-
        recip-info}
DBEKMRecipientInfo::=CHOICE{
    keyManager MasterKeyEncryptedHMACkey,
    server DatabaseServerToKeyManager
}
MasterKeyEncryptedHMACkey::=SEQUENCE{
    masterKeyAID         MasterKeyAlgorithmIdentifier
        OPTIONAL,
    hmacKeyAID MessageAuthenticationCodeAlgorithm
        OPTIONAL,
    encryptedKey OCTET STRING (SIZE(1 . . . MAX))
}
MasterKeyAlgorithmIdentifier::=
    AlgorithmIdentifier {{MasterKeyAlgorithms}}
MasterKeyAlgorithms ALGORITHM::={
    . . . --Expect additional algorithm objects--
}
DatabaseServerToKeyManager::=SEQUENCE{
    encryptedKey MasterKeyEncryptedHMACkey,
    uniqueID UniqueIdentifier OPTIONAL--May be
        known system wide--
}
UniqueIdentifier::=UniqueID {{SchemaIdentifier}}
SchemaIdentifier DBEKM::={
    simpleString,
    . . . --Expect additional schema identifier objects--
}
simpleString DBEKM::={
    OID id-SimpleString PARMS SimpleString
}
SimpleString::=UTF8String (SIZE(1 . . . MAX))
DBEKM::=CLASS{
    &id OBJECT IDENTIFIER UNIQUE,
    &Type OPTIONAL
}
    WITH SYNTAX {OID &id [PARMS &Type]}
UniqueID {DBEKM:IOSet}::=SEQUENCE{
    name DBEKM.&id({IOSet}),
    type DBEKM.&Type({IOSet}{@name}) OPTIONAL
}
DbEKMAttributeSet::=
    SEQUENCE SIZE(1 . . . MAX) OF Attribute {{DbEK-
        MAttributes}}
DbEKMAttributes ATTRIBUTE::={
    uniqueIdentifier,
    . . . --Expect user schema identifier attributes--
}
uniqueIdentifier ATTRIBUTE::={
    WITH SYNTAX UniqueIdentifier ID id-UniqueIden-
        tifier
}
END--DbEKM--
```

Figure 2:
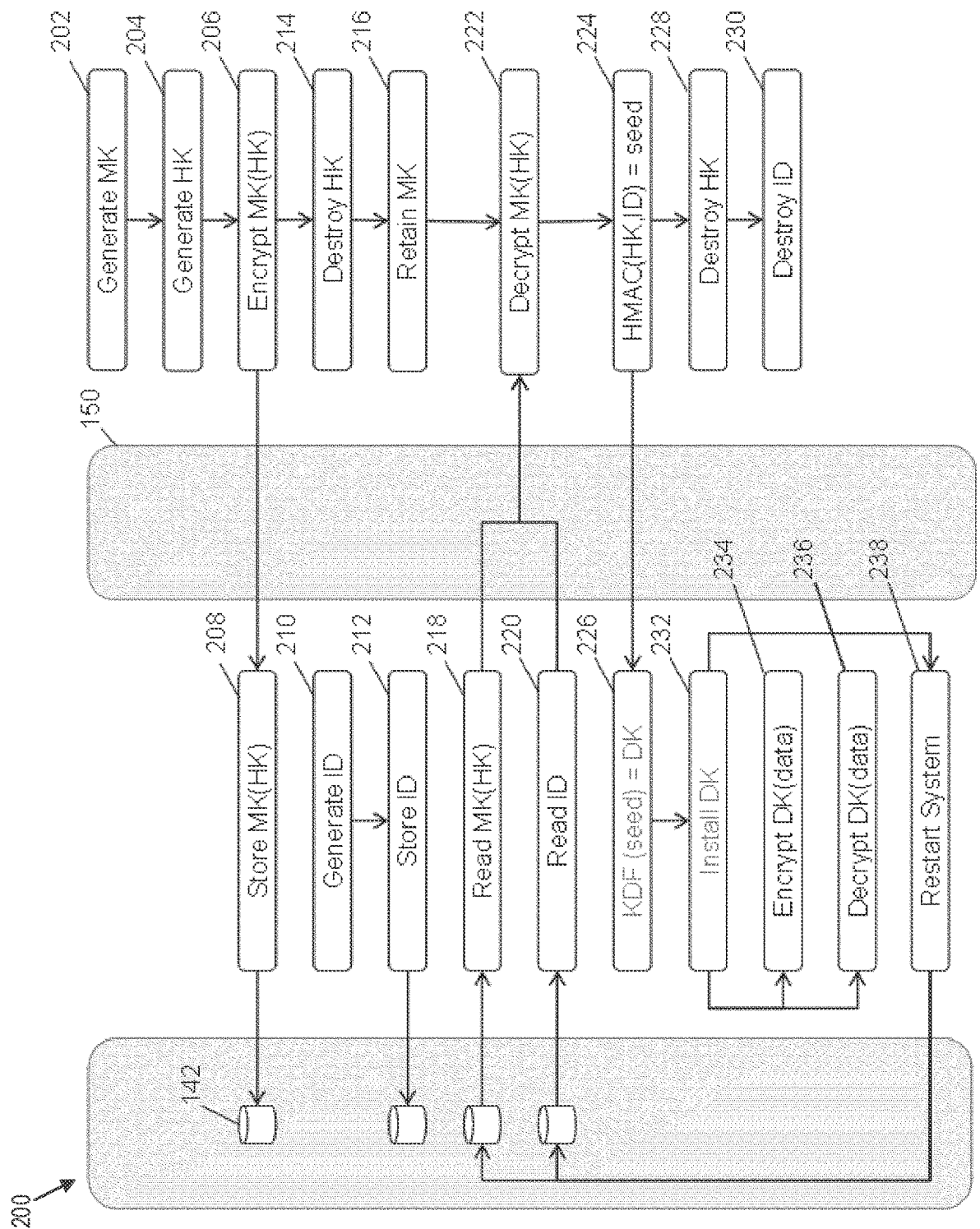
FIG. 2 is a schematic flow diagram of a method of creating an initial database encryption key on a single database server without transmitting cleartext keys, according to an example embodiment.

Referring now to FIG. 2, a method 200 of creating an initial DEK without transmitting cleartext keys is shown, according to an example embodiment. In the example embodiment, the method 200 is performed by a cryptographic module, such as the key manager circuit 114, and the interface circuit 112 of FIG. 1, via operative communication with the first third-party computing system 102 and/or the second third-party computing system 106. However, it should be understood that the method 200 may be similarly performed using other systems or components thereof, as described herein.

At 202, a master key encryption key 122 is generated by the key manager circuit 114. The key manager circuit 114 directs the HSM 118 to store the master key encryption key 122, in the cleartext format, in permanent (e.g., non-volatile) memory, such as the key vault 140 of the HSM 118. In some embodiments, the master key encryption key is encrypted by the key manager circuit 114 and stored encrypted outside the HSM 118.

At 204, a keyed-hash message authentication code (HMAC) key 124 is generated by the key manager circuit 114. The purpose of the HMAC key 124 is to further secure the message(s) exchanged by the key manager circuit 114 and the database server 116 across the secure connection 150 by verifying the data integrity and origin authenticity of each message.

At 206, a HMAC key cryptogram 126 is generated by the key manager circuit 114 by encrypting the HMAC key 124 with the master key encryption key 122. At 214, the HMAC key 124 is deleted to avoid security vulnerabilities associated with permanently storing the HMAC key 124. The master key encryption key 122, however, is retained at 216 and stored on the HSM 118.

At 208, the interface circuit 112 provides the HMAC key cryptogram 126 to the database server 116 via the secure connection 150. The database server 116 stores the HMAC key cryptogram 126 in local storage 142. In embodiments where the database server 116 is part of an electronic device, such as a mobile device or an IoT device, the HMAC key cryptogram 126 is stored in permanent memory of the electronic device.

Figure 5:
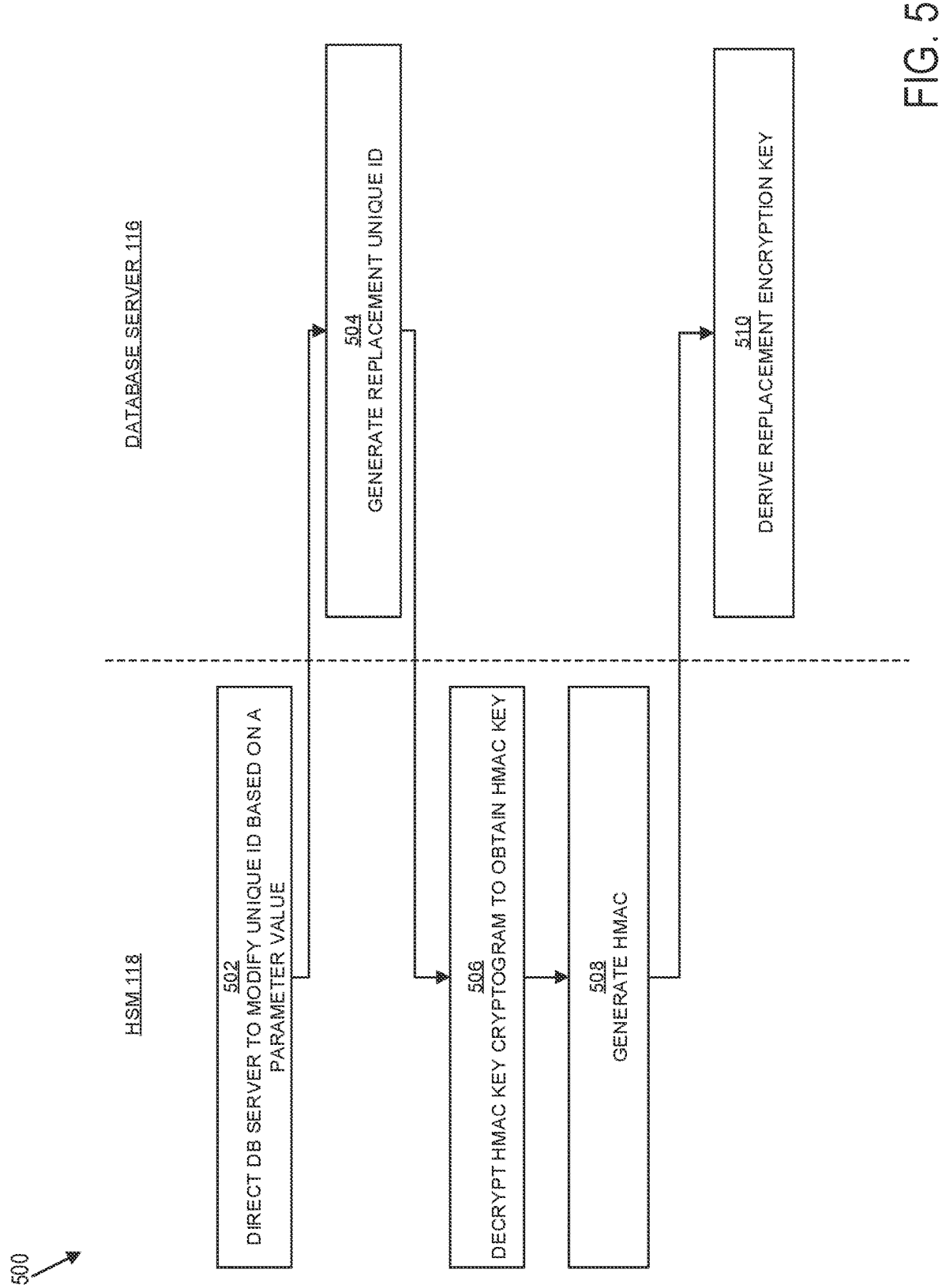
FIG. 5 is a schematic flow diagram of a method of generating unique identifiers in a database encryption key management protocol, according to an example embodiment.

At 210, the database server 116 generates a unique identifier 128 as described further herein in reference to FIG. 5. The purpose of the unique identifier 128 is to uniquely identify to the database server 116 to the HSM 118. In some embodiments, the unique identifier 128 comprises an ordered list of database server attributes. The database server attributes may include database properties: for example, a host name, a geographic location indicator, a database server identifier, a database application name (e.g., in embodiments where a database application generates the unique identifier 128), a string identifying a database encryption algorithm used in the transaction, and/or a string identifying a data element in the database.

At 212, the database server 116 stores the unique identifier 128 in local storage 142 associated with the database server 116.

Processes 218-238 pertain to generating the DEK 130, which is used by the database server 116 to cryptographically protect the data processed by the database server 116.

To obtain a seed for the DEK 130, the database server 116 sends a request to the HSM 118 over the secure connection 150. At 218, the database server 116 retrieves the HMAC key cryptogram 126 from the local storage 142. At 220, the database server 116 retrieves the unique identifier 128 from the local storage 142. These retrieved values are sent to the HSM 118 through the secure connection 150.

At 222, the HMAC key cryptogram 126 is decrypted by the key manager circuit 114 using the master key encryption key 122 to obtain the HMAC key 124. At 224, a seed 132 is generated by the key manager circuit 114 using the HMAC key 124 and the unique identifier 128. Advantageously, at 228 and 230, respectively, the HMAC key 124 and the unique identifier 128 are deleted from the HSM 118 to reduce security vulnerabilities. The seed 132 is generated by calling an HMAC function, the executable file for which may be, for example, installed on the HSM 118, and the seed 132 is transmitted to the database server 116 through the secure connection 150. The purpose of the seed 132 is to securely generate a secret value that serves as an input to a key derivation function (KDF) executed on the database server 116 to generate the DEK 130.

At 226, the database server 116 derives the DEK 130 using the seed 132 as an input to a KDF. According to various embodiments, the algorithm for the KDF is based on, for example, NIST SP 800-108, ISO/IEC 11770-6, or another suitable standard.

At 232, the DEK 130 is installed on the database server 116. At 234 and 236, respectively, the data processed on the database server 116 is encrypted and decrypted using the DEK 130. Advantageously, the DEK 130 is not stored in local storage 142 associated with the database server 116.

When the database server 116 is restarted at 238, the DEK 130, which is stored in volatile memory of the database server 116, is erased. As used herein, the term "volatile memory" refers to computer storage that maintains its data only while the device (e.g., the database server 116) is powered. The term "non-volatile memory" refers to long-term persistent storage implemented, for example, on permanent computer storage media, that maintains its data even when the device is powered off. The database server 116 can regenerate the DEK 130 by reacquiring the seed 132. When the database server 116 is restarted, the process returns to 218, such that the database server 116 again retrieves the HMAC key cryptogram 126 and the unique identifier 128 from the local storage 142 and uses these items to request the seed 132 from the HSM 118 so as to regenerate the DEK 130.

Figure 3:
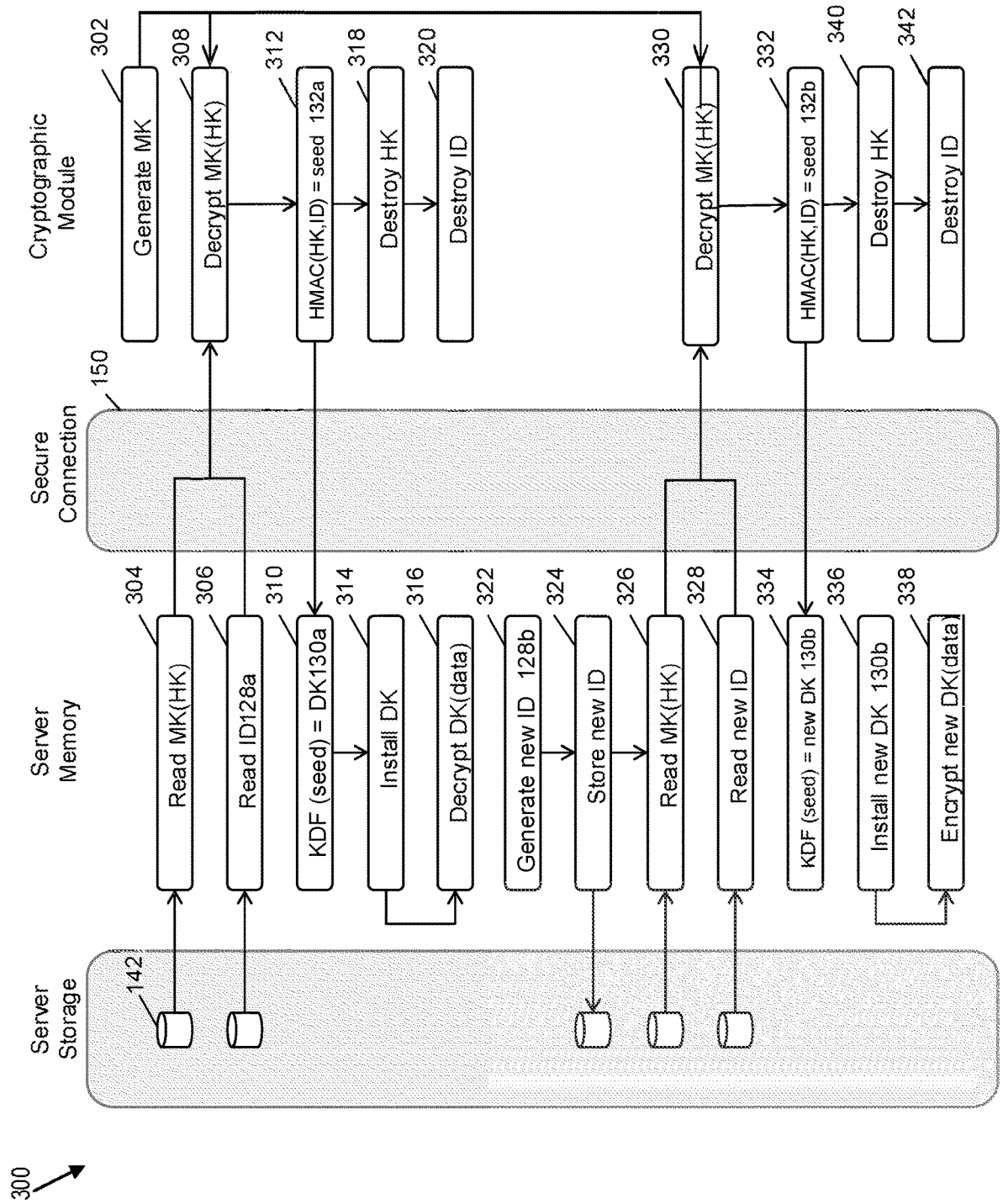
FIG. 3 is a schematic flow diagram of replacing a database encryption key with a new database encryption key without transmitting cleartext keys, according to an example embodiment.

Referring now to FIG. 3, a method 300 is shown for replacing a database encryption key 130a with a new database encryption key 130b without transmitting cleartext keys, according to an example embodiment. The relevant items discussed below are generated and managed by the key manager circuit 114 of the HSM 118 via instructions transmitted to the database server 116 by the interface circuit 112 though the secure connection 150. Thus, the steps described herein, in some embodiments, are performed by the database server 116 or the HSM 118 in response to these instructions. As shown, the database server 116 can change the DEK 130a at any time by changing the unique identifier 128a.

As shown at 302-316 and similar to the process described in FIG. 1, the data was previously encrypted by the database server 116 by sending a request to the HSM 118 with the HMAC key cryptogram 126 and the unique identifier 128a, generating the DEK 130a using the KDF with the seed 132a received from the HSM 118, and encrypting the data using the DEK 130a stored in volatile memory of the database server 116.

To change the DEK 130a, the database server 116 generates and stores a new unique identifier 128b at 322 and 324, respectively. The database server 116 sends a request to the HSM 118 with the HMAC key cryptogram 126, retrieved from local storage 142 at 326, and the new unique identifier 128b retrieved from local storage 142 at 328.

At 330, the HMAC key cryptogram 126 is decrypted by the key manager circuit 114 using the master key encryption key 122 to obtain the HMAC key 124. At 332, a new seed 132b is generated by the key manager circuit 114 using the HMAC key 124 and the unique identifier 128b. Advantageously, at 340 and 342, respectively, the HMAC key 124 and the unique identifier 128b are deleted from the HSM 118 to reduce security vulnerabilities.

At 334, the database server 116 generates a new DEK 130b using the new seed 132b generated by the HSM 118 at 332, installs the new DEK 130b (at 336) and encrypts the data (at 338) using the new DEK 130b.

According to various embodiments, the database server 116 can decrypt data with the old DEK 130a and re-encrypt the data with the new DEK 130b. This can be done with all of the data at once, or managed as a gradual migration between the old DEK 130a and the new DEK 130b.

Advantageously, the HSM 118 only retains the master key encryption key 122. The HSM 118 destroys the old DEK 130a and the new DEK 130b, the old unique identifier 128a and the new unique identifier 128b, and the old and new seeds 132a and 132b, respectively. As to the database server 116, as long as the database server 116 can manage and generate its unique identifiers 128n, it can manage and replace its DEKs 130n accordingly. Advantageously, the database server 116 cannot generate a new DEK 130b without obtaining a new seed 132b from the HSM 118. In some embodiments, the database server 116 can recover the old DEK 130a as needed, as long as the database server 116 archives the HMAC key cryptogram 126 and the associated old unique identifier 128a.

Figure 4:
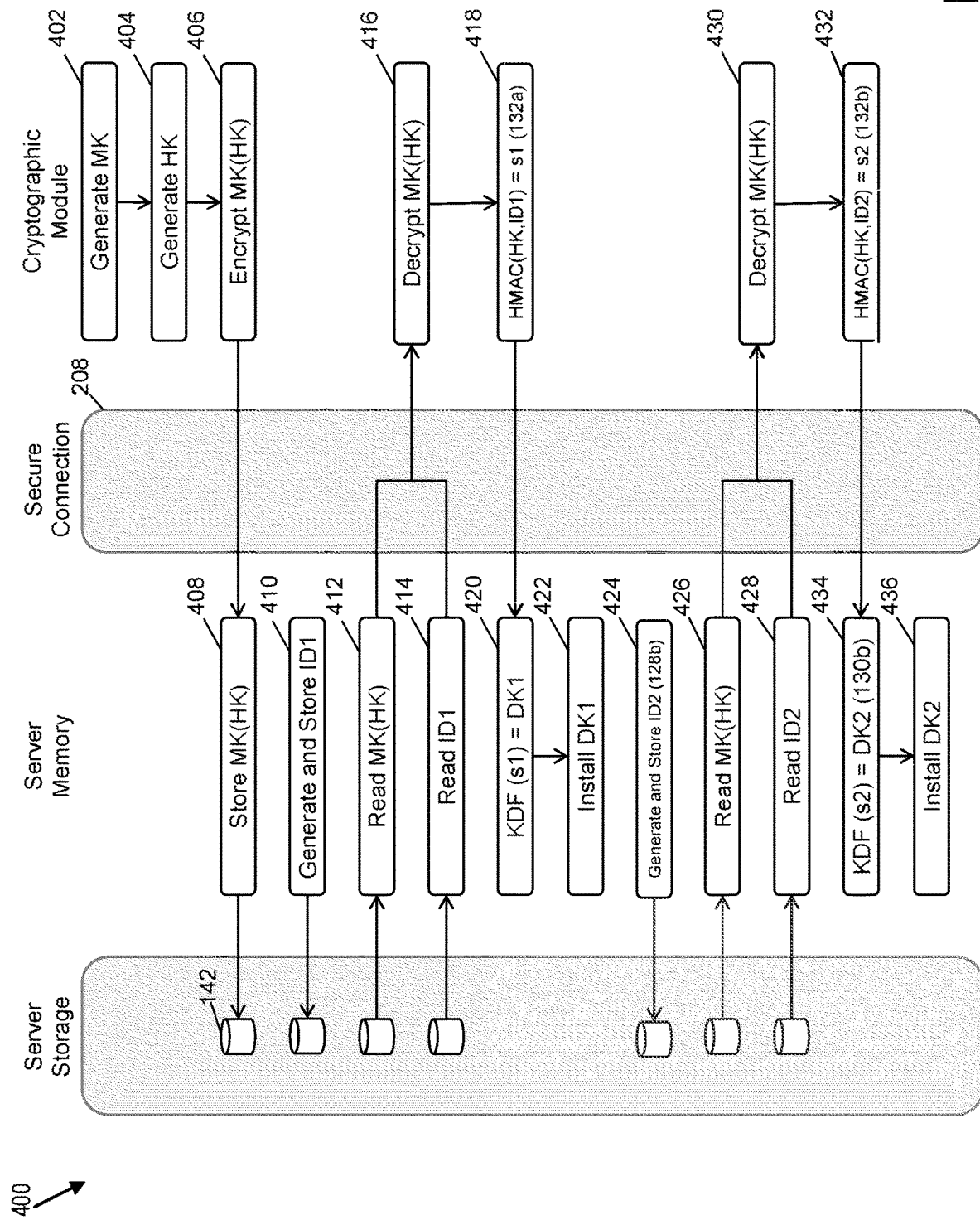
FIG. 4 is a schematic flow diagram of a method of managing multiple database encryption keys on a single database server using the same HMAC key with the same master key encryption key.

Referring now to FIG. 4, a method 400 of managing multiple database encryption keys 130 on a single database server using the same HMAC key 124 with the same master key encryption key 122 is shown, according to an example embodiment. The relevant items discussed below are generated and managed by the key manager circuit 114 of the HSM 118 via instructions transmitted to the database server 116 by the interface circuit 112 though the secure connection 150. Thus, the steps described herein, in some embodiments, are performed by the database server 116 or the HSM 118 in response to these instructions. As shown, in the example embodiment, a single database server 116 might need multiple DEKs 130n to protect different information instead of using the same DEK, such as the DEK 130a, for all data that needs encryption.

As shown and similar to the process described in FIG. 1, the database server 116 can manage multiple DEKs 130a and 130b by managing multiple unique identifiers 128a and 128b. The cryptographic module, such as the HSM 118, generates a single master key encryption key 122 and a single HMAC key 124, encrypts the HMAC key 124 using the master key encryption key 122, and sends the HMAC key cryptogram 126 to the database server 116 over a secured channel, such as the secure connection 150. The database server 116 stores the HMAC key cryptogram 126 and, at some previous or subsequent point in time, the database server 116 generates multiple unique identifiers, such as the first unique identifier 128a and the second unique identifier 128b: one unique identifier, respectively, for the first DEK 130a and the second DEK 130b. Meanwhile, the cryptographic module, such as the HSM 118, destroys the HMAC key 124 but retains the master key encryption key 122.

To obtain a seed 132a for the first DEK 130a, the database server 116 sends a request to the HSM 118 over the secure connection 150. The request contains the HMAC key cryptogram 126 and the first unique identifier 128a. The HSM 118 decrypts the HMAC key 124 using the master key encryption key 122, generates the seed 132a using the HMAC algorithm with the HMAC key 124 and the first unique identifier 128a, and sends the seed 132a to the database server 116 over the secured connection 150. The server generates the first DEK 130a using a suitable KDF function with the seed 132a and installs the DEK 130a into its memory for data encryption and decryption. Meanwhile, the HSM 118 destroys the HMAC key 124 and the seed 132a.

To obtain a seed 132b for the second DEK 130b, the database server 116 sends a request to the HSM 118 over the secure connection 150. The request contains the HMAC key cryptogram 126 and the second unique identifier 128b. The HSM 118 decrypts the HMAC key 124 using the master key encryption key 122, generates the second seed 132b using the HMAC algorithm with the HMAC key 124 and the second unique identifier 128b, and sends the second seed 132b to the database server 116 over the secured connection 150. The server generates the second DEK 130b using a suitable KDF function with the second seed 132b and installs the DEK 130b into memory for data encryption and decryption. Meanwhile, the HSM 118 destroys the HMAC key 124 and the second seed 132b.

When the database server 116 is restarted and the DEKs are erased from memory, the database server 116 can regenerate the DEKs by reacquiring the first seed 132a and the second seed 132b at any time by resending the HMAC key cryptogram 126 as well as the first unique identifier 128a and the second unique identifier 128b to the HSM 118.

Referring now to FIG. 5, a method 500 of generating and replacing unique identifiers 128 is shown, according to an example embodiment. A unique identifier 128 may be amended in order to add an extra layer of data privacy. To accomplish this, in some embodiments, the key manager circuit 114 maintains a repository of replacement identifiers that obscure network management information, database management information, and/or the encryption schema that is used (e.g., AES512, AES256, etc.) to generate the master key encryption key. This information may be replaced with non-descriptive values for which a translation table is not exposed to entities outside the database encryption key management system 110.

In method 500 of FIG. 5, at 502, the key manager circuit 114 directs the database server to modify the unique identifier 128 based on a value supplied by the system administrator through the key manager circuit 114. In some embodiments, the key manager circuit 114 generates the unique identifier 128. In some embodiments, the value supplied by the key manager circuit 114 includes a parameter that identifies the database server 116. In certain embodiments, the parameter includes at least an object identifier associated with the database server 116. The object identifier may be globally unique or may be unique in a specified context. The parameter may include a Relative Object Identifier string that may be parsed and stored as an XML-represented string. The Relative Object Identifier may be encoded as a binary value.

In one example embodiment, the object identifier is a relative OID that represents a date/time value, a date time variable may be declared in a suitable programming language as follows:
   DateTime::=RELATIVE-OID--{yy mm dd hh mm ss z}
   For instance, the following value of DateTime can be used to represent Jan. 1, 2001 00:00:00 (GMT):
   example DateTime::={year(2001) month(1) day(1) hours
      (0) minutes(0) seconds(0) z(0)}
This example value can be encoded for transfer using an encoding schema, such as a Distinguished Encoding Rules (DER) based schema, in only eight octets and can be represented by the hexadecimal value "07 D1 01 01 00 00 00 00".

In another example embodiment, the relative OID represents the relevant components of the network as well as the encryption algorithm used to generate the master key encryption key, as shown below:
   example CustomID::={dataCenter(7) server(9) DB(2)
      column(3) algorithm(9)}
In yet another example embodiment, the relative OID is defined as follows:
   dbEKM OID::={
      joint-iso-itu-t(2) country(16) us(840) organization(1)
         wfbna(114171)
      lobs(4) eisArchitecture(1) techniques(2) dbEKM(0)
   }
   id-SimpleString OID::={dbEKM ss(1)}
   id-UniqueIdentifier OID::={dbEKM uid(2)}
   id-dbekm-recip-info   OID::={iso   member-body(2)
      us(840) x973(10060) km(2)3}
Similar to the first example, the CustomID value may be encoded in eight octets and represented by a non-descriptive hexadecimal value. Thus, compact binary encodings of this information are achieved, which provides additional communications security and increases throughput via the network 111.

Referring to the method 500 of FIG. 5, at 504, the interface circuit 112 generates a new unique identifier 128c. In some embodiments, as shown above, the new unique identifier 128c comprises an ordered list of database server attributes, such as a host name, a geographic location indicator, a database server identifier, a database application name in embodiments where a database application generates the substitute unique identifier 128c, a string identifying a database encryption algorithm used in the transaction, and/or a string identifying an element of a data element in the database.

At 506, the key manager circuit 114 retrieves the HMAC key cryptogram 126 and the new unique identifier 128c provided by the database server 116 via the secure connection 150.

At 508, according to some embodiments, a replacement HMAC 132b is generated by the key manager circuit 114 using the HMAC key cryptogram 126 and the new unique identifier 128c.

At 510, the replacement HMAC 132b is transmitted by the key manager circuit 114, via the secure connection 150, to the database server 116. The database server 116 is configured to derive a replacement DEK 130c using at least the replacement HMAC 132b as an input to a key derivation algorithm as described, for example, in FIG. 4. The replacement DEK 130c is stored in volatile memory of the database server 116.

Figure 6A:
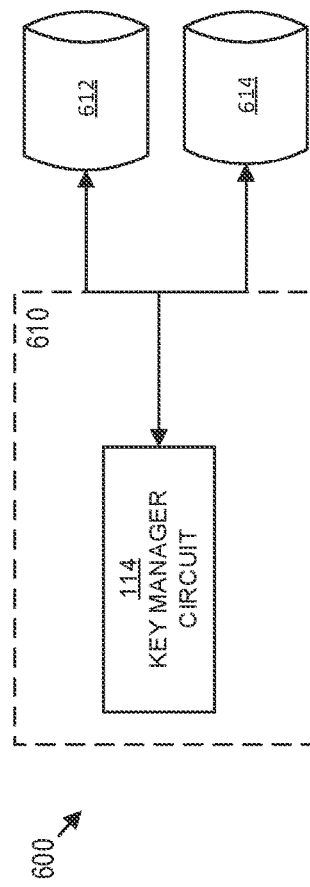
FIG. 6A is a diagram of a system for managing an HMAC in a configuration with multiple database servers, providing an additional level of security with different HMAC keys across multiple databases.
Figure 6B:
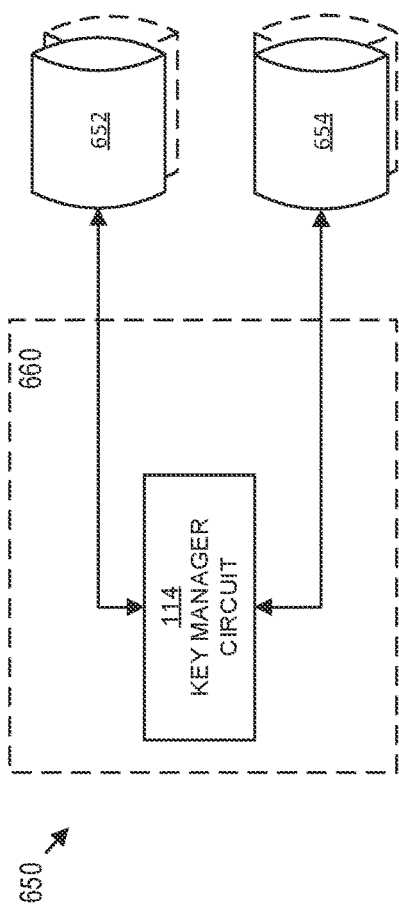
FIG. 6B is a diagram of a system for managing an HMAC in a configuration with multiple database servers, providing an additional level of security with multiple master key encryption keys per HSM.
Figure 6C:
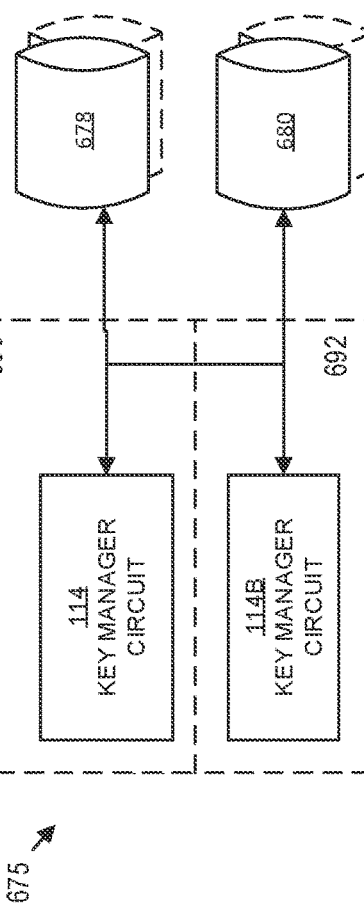
FIG. 6C is a is diagram of a system for managing an HMAC in a configuration with multiple database servers, providing an additional level of security with multiple HSMs.

Referring now to FIG. 6A-6C, component diagrams of database servers for managing different groups of DEKs are shown, according to example embodiments. These configurations add extra layers of data security, as set forth herein.

Referring now to FIG. 6A, the infrastructure 600 comprises a first database server 612 and a second database server 614. A component diagram is shown where a unique HMAC key 124 is generated per database server 116, which eliminates the need to reuse the same seed across multiple databases and provides additional security in the event one of the databases is compromised. Here, the key manager circuit 114 is included within a single HSM 610. In an example embodiment, the key manager circuit 114 generates a first HMAC key 124 corresponding to the first database server 612, and a second HMAC key 124b, corresponding to the second database server 614. As to the first database server 612, generating a DEK by the first database server 612 is managed according, for example, to the method illustrated in FIG. 2. As to the second database server 614, the key manager circuit 114 encrypts the second HMAC key 124b using the master key encryption key 122 to generate the third HMAC key cryptogram 126c such that the master key encryption key 122 remains the same for both database servers. The third HMAC key cryptogram 126c is provided to the second database server 614, which generates a third unique identifier 128d and a third DEK 130d. Thus, the DEK generated by the second database server 614 is different from the DEK generated by the first database server 612.

Referring now to FIG. 6B, a component diagram is shown where the key manager circuit 114 is comprised within a single HSM 660. The same master key encryption key 122 is used for multiple database servers 116 but a unique master key encryption key 122 is used per database group (652, 654) by managing multiple master key encryption keys 122 per HSM. Thus, data in each database group is encrypted using a separate master key encryption key.

In an example embodiment, the infrastructure 650 comprises a first database group 652 and a second database group 654. The key manager circuit 114 manages the infrastructure by associating the first master key encryption key 122 with the first database group 652, which may include a first database server 116. Additionally or alternatively, a master file key may be used to manage multiple master key encryption keys. The key manager circuit 114 associates the second master key encryption key 122b with the second database group 654, which may include a second database server. The key manager circuit 114 associates both database groups with the HSM 660. Thus, multiple master key encryption keys are managed by HSM 660, providing additional security in the event one of the database groups (652, 654) is compromised. For example, if an intruder obtains the master key encryption key 122, only the first database group 652 would be compromised because the master key encryption key 122b used for the second database group 654 would be different from the master key encryption key 122. Thus, the integrity of data residing in databases included in the second database group 654 would be protected.

Referring now to FIG. 6C, a component diagram is shown where a unique master key encryption key is used per HSM, providing additional security in the event one of the HSMs is compromised. In an example embodiment, the key manager circuit 114 is coupled to a first HSM 690 and a second HSM 692. The first HSM 690 is associated, by the key manager circuit 114, with a first database group 678, and the second HSM 692 is associated the second database group 680, with separate master key encryption keys 122 being stored and/or associated with each HSM. If an intruder gains unauthorized access to the first HSM 690, only the first database group 678 would be compromised. Thus, the integrity of data residing in databases included in the second database group 654, associated with the second HSM 692, would be protected.

Figure 7:
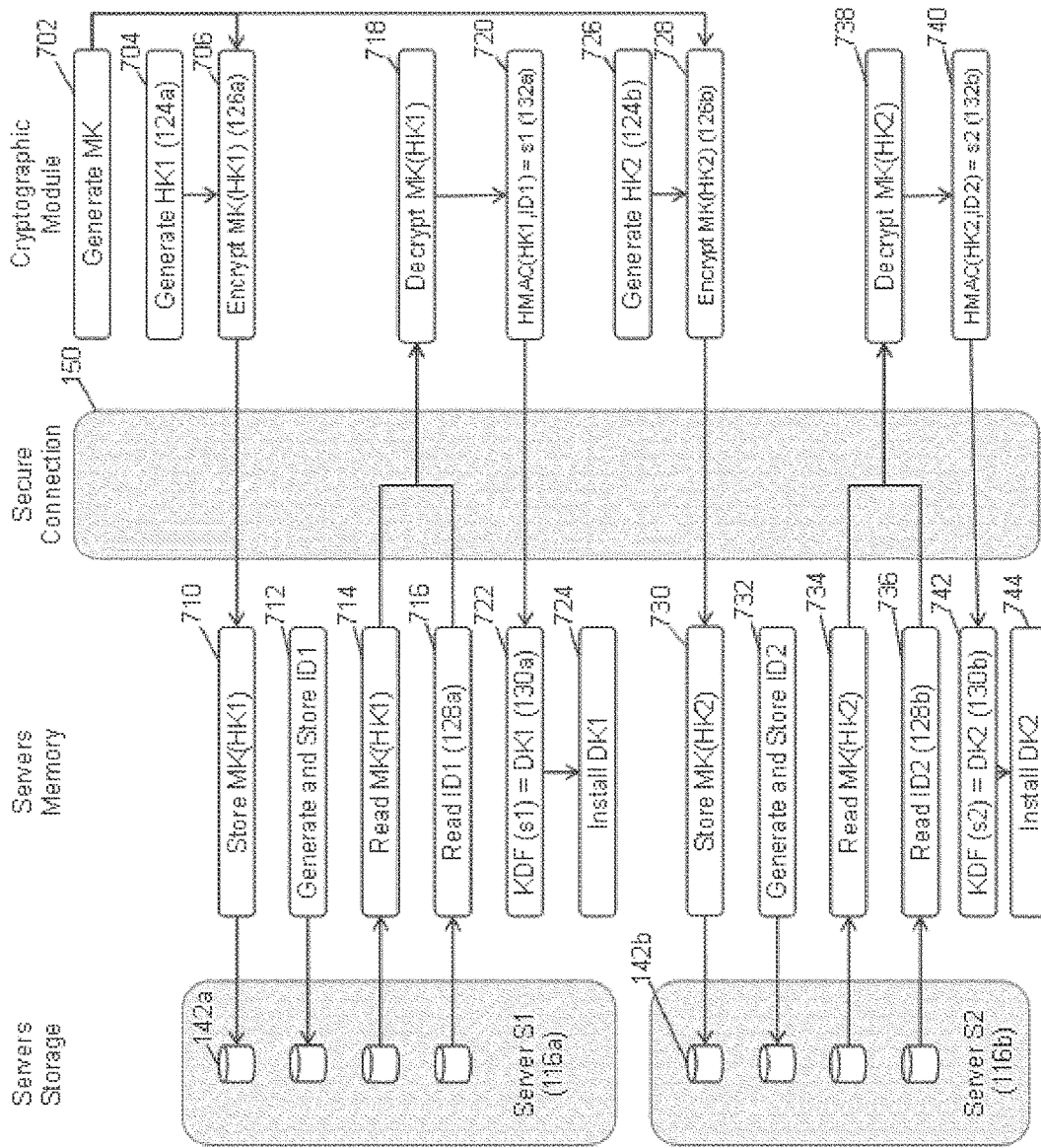
FIG. 7 is a schematic flow diagram of a method of managing more than one database encryption key on more than one database server without transmitting cleartext keys, according to an example embodiment.

Referring now to FIG. 7, a schematic flow diagram is shown of a method 700 of managing more than one database encryption key on more than one database server without transmitting cleartext keys, according to an example embodiment. In the example embodiment, the multiple HMAC keys are managed using a single master key encryption key. The relevant items discussed below are generated and managed by the key manager circuit 114 of the HSM 118 via instructions transmitted to the database server 116 by the interface circuit 112 though the secure connection 150. Thus, the steps described herein, in some embodiments, are performed by the database server 116 or the HSM 118 in response to these instructions. As shown, in the example embodiment, multiple database servers 116n might each need a unique DEK 130n (also labeled as "DK" in FIG. 7).

The cryptographic module, such as the HSM 118, generates a single master key encryption key 122 and multiple HMAC keys 124n, including the first HMAC key 124a and the second HMAC key 124b. One HMAC key is generated per each database server 142a and 142b. The HSM 118 encrypts each HMAC key using the master key encryption key 122, and sends each HMAC cryptogram, 124a and 124b, to the corresponding database server, 142a and 142b, over secure connection 150. The database servers 142a and 142b each store its HMAC cryptogram, 142a and 142b, respectively. At some previous or subsequent point in time, each of database servers 116a and 116b generates a unique identifier, such as the first unique identifier 128a and the second unique identifier 128b, respectively, for the first DEK 130a and the second DEK 130b. Meanwhile, the cryptographic module, such as the HSM 118, destroys the HMAC key 124 but retains the master key encryption key 122.

To obtain a seed 132a for the first DEK 130a, the database server 116a sends a request to the HSM 118 over the secure connection 150. The request contains the first HMAC key cryptogram 126a and the first unique identifier 128a. The HSM 118 decrypts the first HMAC key 124a using the master key encryption key 122, generates seed 132a using the HMAC algorithm with the first HMAC key 124a and the first unique identifier 128a, and sends the seed 132a to the database server 116a over the secured connection 150. The database server 116a generates the first DEK 130a using a suitable KDF function with the seed 132a and installs the DEK 130*a* into memory for data encryption and decryption. Meanwhile, the HSM 118 destroys the first HMAC key 124*a* and the seed 132*a*.

To obtain a seed 132*b* for the second DEK 130*b*, the database server 116*b* sends a request to the HSM 118 over the secure connection 150. The request contains the second HMAC key cryptogram 126*b* and the second unique identifier 128*b*. The HSM 118 decrypts the second HMAC key 124*b* using the master key encryption key 122, generates the second seed 132*b* using the HMAC algorithm with the second HMAC key 124*b* and the second unique identifier 128*b*, and sends the second seed 132*b* to the database server 116*b* over the secured connection 150. The database server 116*b* generates the second DEK 130*b* using a suitable KDF function with the second seed 132*b* and installs the DEK 130*b* into memory for data encryption and decryption. Meanwhile, the HSM 118 destroys the second HMAC key 124*b* and the second seed 132*b*.

When the database server 116*n* is restarted and the DEKs are erased from memory, the database server 116*n* can regenerate the DEKs by reacquiring the first seed 132*a* and the second seed 132*b* as described, for example, with reference to FIG. 4.

Figure 8:
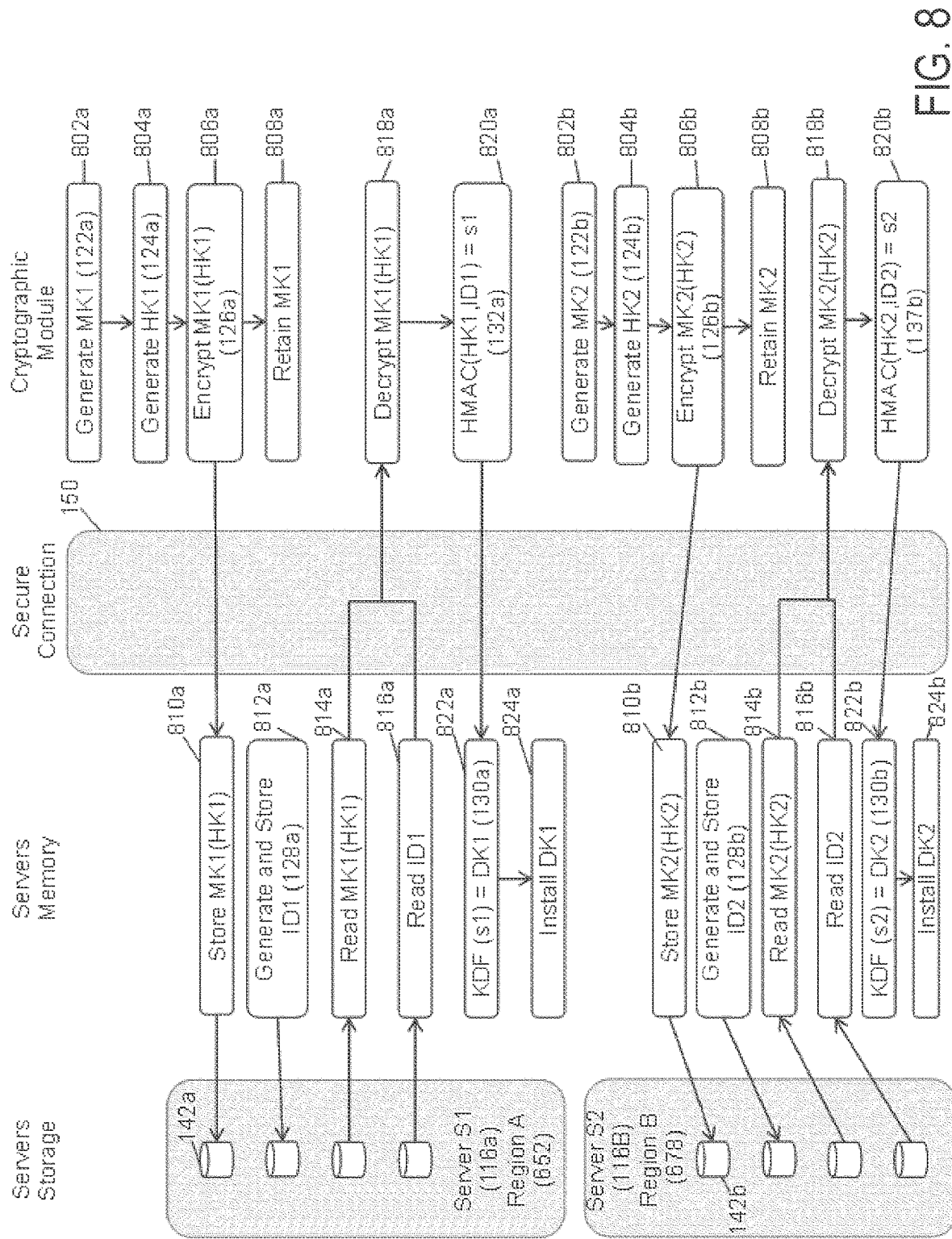
FIG. 8 is a schematic flow diagram of a method of managing more than one HMAC key on more than one database server without transmitting cleartext keys, according to an example embodiment.

Referring now to FIG. 8, a schematic flow diagram is shown of a method 800 of managing more than one HMAC key on more than one database server without transmitting cleartext keys, according to an example embodiment. In the example embodiment, the multiple HMAC keys are managed using multiple master key encryption keys. The relevant items discussed below are generated and managed by the key manager circuit 114 of the HSM 118 via instructions transmitted to the database server 116 by the interface circuit 112 though the secure connection 150. Thus, the steps described herein, in some embodiments, are performed by the database server 116 or the HSM 118 in response to these instructions. As shown, in the example embodiment, multiple database servers 116*n* might each need a unique HMAC key 124*n*.

The cryptographic module, such as the HSM 118, generates a multiple master key encryption keys 122*n*, including the first master key encryption key 122*a* and the second master key encryption key 122*b*, and multiple HMAC keys 124*n*, including the first HMAC key 124*a* and the second HMAC key 124*b*. One master key encryption key HMAC key 124*n* is generated per each database server 116*a* and 116*b*. The HSM 118 encrypts each HMAC key 124*n* using the master key encryption key 122*n*. For example, the first HMAC key 124*a* is encrypted using the first master key encryption key 122*a* and the second HMAC key 124*b* is encrypted using the second master key encryption key 122*b*. The HSM 118 sends each HMAC cryptogram, 142*a* and 142*b*, to the corresponding database server, 116*a* and 116*b*, over a the secure connection 150.

The database servers 116*a* and 116*b* each store its HMAC cryptogram, 124*a* and 124*b*, respectively. At some previous or subsequent point in time, each of database servers 116*a* and 116*b* generates a unique identifier, such as the first unique identifier 128*a* and the second unique identifier 128*b*, respectively, for the first DEK 130*a* and the second DEK 130*b*. Meanwhile, the cryptographic module, such as the HSM 118, destroys the HMAC keys 124*n* but retains the master key encryption keys 122*n*.

To obtain a seed 132*a* for the first DEK 130*a*, the database server 116*a* sends a request to the HSM 118 over the secure connection 150. The request contains the first HMAC key cryptogram 126*a* and the first unique identifier 128*a*. The HSM 118 decrypts the first HMAC key 124*a* using the first master key encryption key 122*a*, generates seed 132*a* using the HMAC algorithm with the first HMAC key 124*a* and the first unique identifier 128*a*, and sends the seed 132*a* to the database server 116*a* over the secured connection 150. The database server 116*a* generates the first DEK 130*a* using a suitable KDF function with the seed 132*a* and installs the DEK 130*a* into memory for data encryption and decryption. Meanwhile, the HSM 118 destroys the first HMAC key 124*a* and the seed 132*a*.

To obtain a seed 132*b* for the second DEK 130*b*, the database server 116*b* sends a request to the HSM 118 over the secure connection 150. The request contains the second HMAC key cryptogram 126*b* and the second unique identifier 128*b*. The HSM 118 decrypts the second HMAC key 124*b* using the second master key encryption key 122*b*, generates the second seed 132*b* using the HMAC algorithm with the second HMAC key 124*b* and the second unique identifier 128*b*, and sends the second seed 132*b* to the database server 116*b* over the secured connection 150. The database server 116*b* generates the second DEK 130*b* using a suitable KDF function with the second seed 132*b* and installs the DEK 130*b* into memory for data encryption and decryption. Meanwhile, the HSM 118 destroys the second HMAC key 124*b* and the second seed 132*b*.

When the database server 116*n* is restarted and the DEKs are erased from memory, the database server 116*n* can regenerate the DEKs by reacquiring the first seed 132*a* and the second seed 132*b* as described, for example, with reference to FIG. 4.

Figure 9:
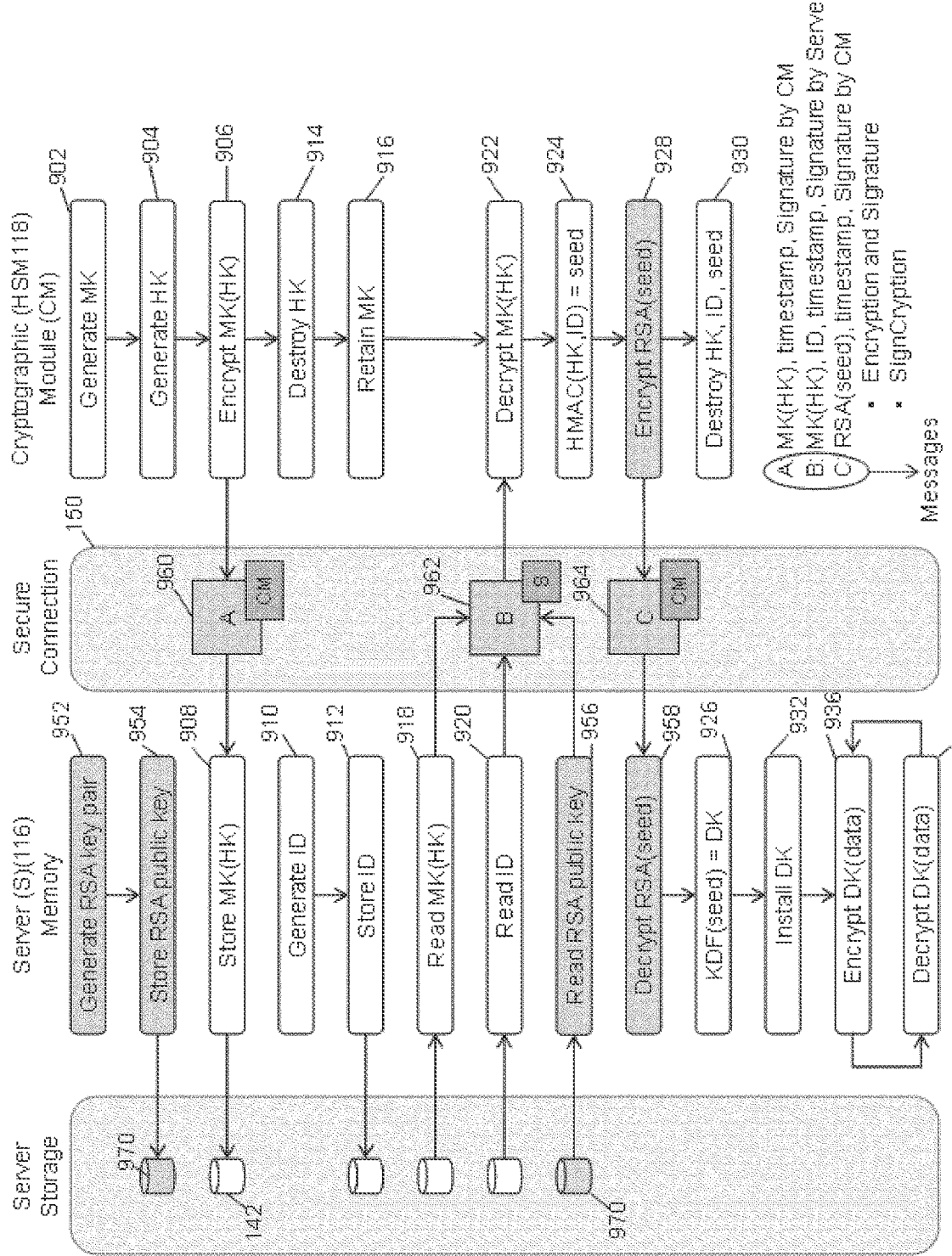
FIG. 9 is a schematic flow diagram of a database encryption secure key management (DBESKM) protocol.

Referring now to FIG. 9, depicted is a schematic flow diagram 900 of a database encryption secure key management (DBESKM) protocol. The relevant items discussed below are generated and managed by the key manager circuit 114 of the HSM 118 via instructions transmitted to the database server 116 by the interface circuit 112 though the secure connection 150. Thus, the steps described herein, in some embodiments, are performed by the database server 116 or the HSM 118 in response to these instructions. As shown, DBESKM enhances DBEKM by adding encryption of the seed 132 and/or other elements exchanged between the database server 116 and the HSM 118 using asymmetric cryptography (e.g. RSA) and digital signatures (e.g. RSA, DSA, and/or ECDSA). Advantageously, the seed 132 and/or other elements are doubly encrypted, once with the server public and again with the secure connection.

DBESKM makes use of currently known encryption algorithms (e.g. AES 256, FIPS 197), the keyed hash message authentication code (HMAC) algorithm (FIPS 198-1) using currently known hash algorithms (e.g., SHA 256, FIPS 180-4), a suitable key derivation algorithm (e.g. SHA 256, FIPS 180-4), and currently known methods for digital signatures (e.g. RSA, X9.31, DSA, FIPS 186-4, ECDSA, X9.62). In some embodiments, cryptographically protected items are packaged into X9.73 messages, such as SignedData and NamedKey EncryptedData. According to various embodiments, DBESKM may incorporate additional asymmetric cryptography (e.g. Signcryption, X9.73, ISO/IEC 29150) and quantum resistant algorithms (e.g. Lattice-Based Polynomial Public Key Establishment Algorithm, X9.98) to cryptographically protect the seed 132 and/or other elements.

At 902, a master key encryption key 122 is generated by the key manager circuit 114. The key manager circuit 114 directs the HSM 118 to store the master key encryption key 122, in the cleartext format, in permanent (e.g., non-volatile) memory, such as the key vault 140 of the HSM 118. In some embodiments, the master key encryption key is encrypted by the key manager circuit 114 and stored encrypted outside the HSM 118.

At 904, a keyed-hash message authentication code (HMAC) key 124 is generated by the key manager circuit 114. The purpose of the HMAC key 124 is to further secure the message(s) exchanged by the key manager circuit 114 and the database server 116 across the secure connection 150 by verifying the data integrity and origin authenticity of each message.

At 906, a HMAC key cryptogram 126 is generated by the key manager circuit 114 by encrypting the HMAC key 124 with the master key encryption key 122. At 914, the HMAC key 124 is deleted to avoid security vulnerabilities associated with permanently storing the HMAC key 124. The master key encryption key 122, however, is retained at 916 and stored on the HSM 118.

The HMAC key cryptogram 126 is cryptographically protected with a reliable timestamp as a signed message using the private key of the HSM 118 prior to being transmitted from the HSM 118 to the database server 116 through the secure connection 150. As part of cryptographically protecting the HMAC key cryptogram 126 prior to it being transmitted through the secure connection 150 from the HSM 118 to the database server 116, the key manager circuit 114 directs the HSM 118 to encrypt the HMAC key cryptogram 126 using a suitable algorithm to generate the first item 960. In an example embodiment, the first item 960 is a digital message transmitted from the HSM 118 to the database server 116 through the secure connection 150. In addition to the cryptographically protected HMAC key cryptogram 126, the message contains a reliable timestamp. In some embodiments, the message is digitally signed by the HSM 118 using the HSM certificate and/or the HSM private key. When generating the digital signature, signcryption or another suitable method may be used.

As part of the DBEKSM process shown at 900, contemporaneously with process 906 or at some other point in time, at 952, the key manager circuit 114 generates, using volatile memory of the database server 116, an RSA key pair. The RSA key pair comprises an RSA public key and an RSA private key, both associated with the database server 116. At 954, the RSA public key is stored by the key manager circuit 114 in the RSA key vault 970 of the database server 116. The RSA private key resides only in the volatile memory of the database server 116 and is never written to disk. In some embodiments, the database server 116 can also submit a certificate signing request (CSR) to a certification authority (CA) to obtain a digital certificate, such a X.509 digital certificate. The database server 116 shares the RSA public key with the HSM 118 over the secure connection 150.

At 908, the interface circuit 112 provides the cryptographically protected HMAC key cryptogram 126 to the database server 116 via the secure connection 150. Prior to decrypting the HMAC key cryptogram 126, the key manager circuit 114 directs the database server 116 to verify and decrypt the first item 960 using the public key of the HSM 118 and/or to validate the certificate of the HSM 118, in order to extract the cryptographically protected HMAC key cryptogram 126 from the first item 960.

The database server 116 stores the extracted HMAC key cryptogram 126 in local storage 142. In embodiments where the database server 116 is part of an electronic device, such as a mobile device or an IoT device, the HMAC key cryptogram 126 is stored in permanent memory of the electronic device.

At 910, the database server 116 generates a unique identifier 128 as described herein in reference to FIG. 5. The purpose of the unique identifier 128 is to uniquely identify to the database server 116 to the HSM 118. In some embodiments, the unique identifier 128 comprises an ordered list of database server attributes. The database attributes may include database properties: for example, a host name, a geographic location indicator, a database server identifier, a database application name (e.g., in embodiments where a database application generates the unique identifier 128), a string identifying a database encryption algorithm used in the transaction, and/or a string identifying a data element in the database.

At 912, the database server 116 stores the unique identifier 128 in local storage 142 associated with the database server 116.

Processes 918-938 pertain to generating and cryptographically protecting the seed 132 for the DEK 130, which is used by the database server 116 to cryptographically protect the data processed by the database server 116.

To obtain a seed 132 for the DEK 130, the database server 116 sends a request to the HSM 118 over a secured channel, such as the secure connection 150. At 918, the database server 116 retrieves the HMAC key cryptogram 126 from the local storage 142. At 920, the database server 116 retrieves the unique identifier 128 from the local storage 142. These retrieved values are sent to the HSM 118 through the secure connection 150.

The HMAC key cryptogram 126 and the unique identifier 128 are cryptographically protected prior to being transmitted through the secure connection 150. To accomplish this, at 956, prior to transmitting the HMAC key cryptogram 126 and the unique identifier 128 from the database server 116 to the HSM 118, the key manager circuit 114 retrieves the RSA public key from the RSA key vault 970 and sends the RSA public key to the HSM 118 over the secure connection 150. The HMAC key cryptogram 126 and the unique identifier 128 are cryptographically protected using the RSA private key that resides (is written to) in the volatile memory of the database server 116 to generate the second item 962. In an example embodiment, the second item 962 is a digital message transmitted from the database server 116 to the HSM 118 through the secure connection 150. In addition to the cryptographically protected HMAC key cryptogram 126 and the unique identifier 128, the message contains a timestamp. In some embodiments, the message is digitally signed by the database server 116 using the RSA private key that resides in the volatile memory of the database server 116. When generating the digital signature, signcryption or another suitable method may be used.

At 922, the HMAC key cryptogram 126 is decrypted by the key manager circuit 114 using the master key encryption key 122 to obtain the HMAC key 124. Prior to decrypting the HMAC key cryptogram 126, the key manager circuit 114 directs the HSM 118 to verify and decrypt the second item 962 using the RSA public key in order to extract the HMAC key cryptogram 126 and the unique identifier 128 from the second item 962. In some embodiments, the key manager circuit 114 directs the HSM 118 to validate the certificate associated with the database server 116.

At 924, a seed 132 is generated by the key manager circuit 114 using the HMAC key 124 and the unique identifier 128. The seed 132 is generated by calling an HMAC function, the executable file for which may be, for example, installed on the HSM 118, and transmitted to the database server 116 through the secure connection 150. The purpose of the seed 132 is to securely generate a secret value that serves as an input to a key derivation function (KDF) executed on the database server 116 to generate the DEK 130. Advantageously, at 928 and 930, respectively, the HMAC key 124 and the unique identifier 128 are deleted from the HSM 118 to reduce security vulnerabilities.

At 928, the seed 132 is cryptographically protected using the RSA public key, previously shared by the database server 116 with the HSM 118, to generate the third item 964. In an example embodiment, the third item 964 is a digital message transmitted from the HSM 118 to the database server 116 through the secure connection 150. In addition to the cryptographically protected seed 132, the message contains a timestamp. In some embodiments, the message is digitally signed by the HSM 118 using the HSM private key associated with the HSM 118. When generating the digital signature, signcryption or another suitable method may be used. In some embodiments, the HSM 118 may encrypt the seed 132 using a content encryption key (CEK) via a key establishment method defined, for example, in the X9.73 CMS standard.

The third item 964 is transmitted by the key manager circuit 114 from the HSM 118 to the database server 116, where, at 958, the key manager circuit 114 directs the database server 116 to verify and decrypt the second item 962 in order to extract the seed 132. In some embodiments, the database server 116 verifies the HSM certificate associated with the HSM 118.

Subsequently, at 926, the database server 116 derives the DEK 130 using the seed 132 as an input to a KDF. According to various embodiments, the algorithm for the KDF is based on, for example, NIST SP 800-108, ISO/IEC 11770-6, or another suitable standard. At 932, the DEK 130 is installed on the database server 116. At 934 and 936, respectively, the data processed on the database server 116 is encrypted and decrypted using the DEK 130. Advantageously, the DEK 130 is not stored in local storage 142 associated with the database server 116.

Figure 10:
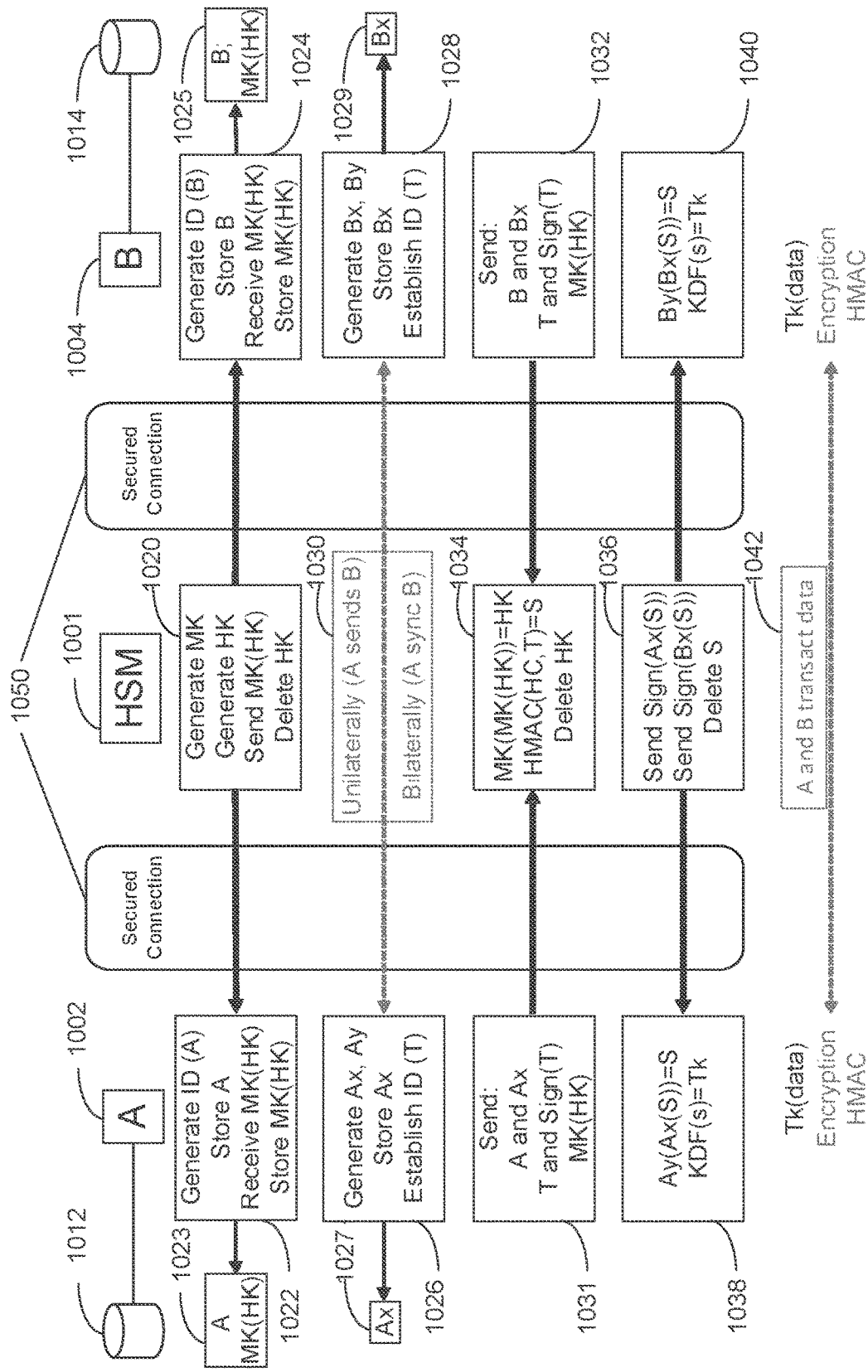
FIG. 10 is a schematic flow diagram of a secure key exchange electronic transactions (SKEET) protocol.

FIG. 10 is a schematic flow diagram of a secure key exchange electronic transactions (SKEET) protocol, according to an example embodiment. In the embodiment of FIG. 10, a SKEET protocol enables two or more entities to transact (e.g., send, exchange) electronic data using a symmetric key generated by a cryptographic hardware security module (HSM). Both entities need only store in non-volatile memory (e.g. disk, flash) a unique identifier of the entity, a public asymmetric encryption and verification key of the entity, and an HSM generated cryptogram. All other cryptographic material including a private asymmetric decryption and signature key, a transaction identifier, and a symmetric transaction key (Tk) is kept and used in volatile memory such that only benign data is stored to disk.

According to various embodiments, the transaction key (Tk) may be used for data encryption, data integrity (MAC or HMAC) or any other cryptographic function that employs a symmetric key between entities. Further, the transaction key (Tk) may be reused within a session for multiple messages, or used once per transaction. Once the HSM generated cryptogram is stored in non-volatile memory of each entity, each entity only needs to send a request and receive a response from the HSM to establish a transaction key (Tk) between the entities.

In some embodiments, the transaction schema (including the transaction identifier and/or transaction key (Tk)) is negotiated in near real-time (contemporaneously). In some embodiments, the transaction key (Tk) is a symmetric key. However, according to various embodiments, the entities might agree on the transaction identifier or the transaction key at different times using bilateral messaging.

The SKEET protocol makes use of modern encryption algorithms (e.g., AES 256, FIPS 197), the keyed hash message authentication code (HMAC) algorithm (e.g., FIPS 198 1) using modern hash algorithms (e.g., SHA 256, FIPS 180 4), any suitable key derivation algorithm (e.g. SHA 256, FIPS 180 4), and digital signatures (e.g. RSA, X9.31, DSA, FIPS 186-4, ECDSA, X9.62). These can be packaged into X9.73 messages, such as SignedData and NamedKey EncryptedData. The SKEET protocol is flexible and can incorporate other asymmetric cryptography (e.g., Signcryption, X9.73, ISO/IEC 29150) and quantum resistant algorithms (e.g. Lattice-Based Polynomial Public Key Establishment Algorithm, X9.98).

In some embodiments, the teachings of FIG. 10 are used in conjunction with the protocol described in U.S. patent application Ser. No. 15/811,789, incorporated herein by reference, and/or of FIG. 9 to establish a transaction key between multiple entities using a common HSM with a common HMAC key and a common transaction identifier. The entities each employ a unique identifier (ID), an asymmetric key pair used for digital signatures and encryption, and a common transaction scheme name (T). Similarly, the communication between an entity and the HSM is over a secure connection (e.g., TLS, IPsec) such that the server has a client (e.g., TLS) certificate and the HSM has a server (e.g., TLS) certificate. Further, the entities have volatile memory, such as server or mobile memory, and non-volatile memory, such as flash for mobile phones or disk drives for servers.

The steps for generating the transaction key (Tk) in an example embodiment are as described in reference to various components of FIG. 10.

In the example embodiment, various hardware components comprise the SKEET infrastructure, including the HSM 1001, the first entity 1002, and the second entity 1004. In some embodiments, the first entity 1002 and the second entity 1004 are servers on a private network sharing an HSM. In some embodiments, the first entity 1002 and the second entity 1004 are servers or mobile devices (such as mobile phones, tablets, laptops, etc. of two users) on a public network sharing crypto (HSM) service. In some embodiments, the first entity 1002 and the second entity 1004 are application servers on private networks sharing cloud (HSM) service. In some embodiments, the first entity 1002 is and application service and the second entity 1004 is a cloud service provider using a common HSM to establish transaction keys (Tk).

In some embodiments, the first entity 1002 and the second entity 1004 are each connected to the first non-volatile storage 1012 and the second non-volatile storage 1014, respectively.

In some embodiments, the HSM is configured to use a single master key encryption key to generate multiple HMAC keys for use among members of various groups even if the various groups have overlapping membership.

In some embodiments, various circuits of a database encryption key management system (such as the database encryption key management system 110 described in reference to FIG. 1) perform the SKEET functions. In some embodiments, these circuits include at least a key manager circuit 114 and an interface circuit 112 as described, for example, in reference to FIG. 1. In various embodiments, the database encryption key management system 110 is separate at least in part from the HSM. Advantageously, in such embodiments, if the HSM is compromised, only its master key encryption key is compromised. For example, the key manager circuit 114 and the interface circuit 112 may comprise computer-readable media having executable code that may reside on and/or be executed by or through a computing device separate from the HSM. In some embodiments, the computing device is a mobile device, such as a smart phone, tablet, laptop, etc.

At 1020, the HSM 1001 generates a master key encryption key (MK). The HSM 1001 generates an HMAC key (HK). The HSM 1001 encrypts the HMAC key (HK) using the master key encryption key (MK) and sends the signed cryptogram MK(HK) to the first entity 1002 and the second entity 1004. In some embodiments, this information is sent through a secured connection 1050. In some embodiments, the HSM 1001 sends the signed cryptogram MK(HK) only to the first entity 1002, which then shares it with other entities, such as the second entity 1004. In some embodiments, the MK(HK) is shared by the first entity 1002 with other entities by distributing a link, such as a URL and/or an IP address. Advantageously, if the first entity 1002 is compromised, the operator of the database encryption key management system 110 may configure the database encryption key management system 110 to prohibit access to the URL such that it cannot be used to distribute information and/or encryption keys to additional entities.

At 1022 and 1024, each entity (of the first entity 1002 and the second entity 1004 in the example embodiment) verifies the HSM signature and stores the cryptogram MK(HK) in its non-volatile storage. Each entity generates a unique ID (as described, for example, in reference to FIG. 5 and FIG. 7) and stores the unique ID to in its non-volatile storage. Thus, the first entity 1002 receives the cryptogram MK(HK), generates a first unique ID, and, at 1023, stores the first unique ID and the cryptogram MK(HK) to the non-volatile storage 1012. The second entity 1004 receives the cryptogram MK(HK), generates a second unique ID, and, at 1025, stores the second unique ID and the cryptogram MK(HK) to the non-volatile storage 1014.

At 1026 and 1028, each entity generates an asymmetric key pair and stores the public key (x), x being the respective entity, to disk. Thus, the first entity 1002 generates the first key pair Ax, Ay and stores Ax in the non-volatile storage 1012 at 1017. The second entity 1004 generates the second key pair Bx, By and stores Bx in the non-volatile storage 1014 at 1029. Here, Ax and Bx are public keys of each entity and Ay and By are private keys of each entity. In some embodiments, each entity can submit a certificate signing request (CSR) to a certification authority (CA) to obtain an X.509 digital certificate or similar.

At 1030, one, both or all entities establish a transaction scheme T. According to various embodiments, the transaction scheme T may be established unilaterally or bilaterally, and/or the first entity 1002 and the second entity 1004 may negotiate aspects of the scheme T at the same time or at different times (e.g., a minute later, a day later, a week later, a year later, as long as T is still active such that the HSM still has a copy of the seed.)

In some embodiments, more than two entities are part of the transaction. For example, parties A and B normally can just exchange a key directly, but when there are more than two parties (such as in a chain of, for example, blockchain-based transactions between A and a B, B and a C, C and a D, etc.), some of these parties might not be a part of the original transaction between A and B. They may have been added after the fact. In an example embodiment responsive to this scenario (for example, to enable the exchange of data between B and C), B may pass along to C the encrypted HMAC key and transaction identifier for the chain of events that include the original transaction between A and B. C may be added to the group by or using the HSM, proceed to obtain a copy of the seed from the HSM, and derive the transaction key (Tk) as described at 1034-1040.

At 1031 and 1032, each entity reads from its non-volatile storage and sends the signed cryptogram MK(HK), unique ID, scheme name (T) and public key (e.g., Ax, Bx) to the HSM 1001.

At 1034, the HSM 1001 validates the entity signature and decrypts the HMAC key (HK) using the master key encryption key generated at 1020. Also at 1034, the HSM 1001 generates a seed (S) using the HMAC algorithm, the HMAC key and the scheme name (T) received from the first entity 1002 and/or the second entity 1004 at 1031 and/or 1032, respectively. The HSM 1001 deletes the HMAC key from its memory.

At 1036, the HSM 1001 encrypts the seed (S) using the entity public key, and sends the encrypted seed (e.g., Ax(S) and/or Bx(S)) to the corresponding entity. In some embodiments, the HSM 1001 may encrypt the seed using a content encryption key (CEK) via a key establishment method defined, for example, in the X9.73 CMS standard.

At 1038 and 1040, each entity verifies the HSM signature, decrypts the seed using the private key (e.g., Ay and By, respectively) and derives the transaction key (Tk) using the seed as input into a key derivation function (KDF). Advantageously, the transaction key (Tk) is not stored in any non-volatile storage associated with either entity or with the HSM such that the transaction key Tk is less likely to become compromised through hacking, data loss, etc.

At 1042, the first entity 1002 and the second entity 1004 transact (e.g., send, exchange), data. Thus, one, both (or all) entities have established a transaction key (Tk) that can be used directly with each other to encrypt data, generate or verify a MAC or HMAC, or use the transaction key (Tk) in other methods that use a symmetric key.

The arrangements described herein have been described with reference to drawings. The drawings illustrate certain details of specific arrangements that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for managing secure key exchange electronic transactions without transmitting cleartext keys, the method comprising:
   storing, by a first entity computing system, a hash-based message authentication code (HMAC) key cryptogram in a non-volatile storage of the first entity computing system, the HMAC key cryptogram previously generated by a database encryption key management system associated with a hardware security module (HSM) and received by the first entity computing system from the HSM;
   generating, by the first entity computing system, an asymmetric key pair comprising a public key and a private key;

storing, by the first entity computing system, the public key in the non-volatile storage;

generating, by the first entity computing system, a transaction scheme, wherein the transaction scheme is one of a unilateral transaction scheme and a bilaterally negotiated transaction scheme; and transmitting, by first entity computing system, an electronic message to a second entity computing system, the electronic message cryptographically protected using a transaction key (Tk) of the transaction scheme.

2. The method of claim 1, further comprising causing the Tk to be generated by:

transmitting, by the first entity computing system, the HMAC key cryptogram, the transaction scheme, and the public key to the database encryption key management system;

receiving, by the first entity computing system, a seed generated by the database encryption key management system based on the HMAC key cryptogram and the transaction scheme, the seed cryptographically protected by the database encryption key management system using the public key generated by the first entity computing system;

decrypting, by the first entity computing system, the seed; and based on the seed, deriving, by the first entity computing system, the Tk;

the Tk not being stored in the non-volatile storage associated with the first entity computing system.

3. The method of claim 2, further comprising using the seed as an input to a key derivation algorithm (KDF).

4. The method of claim 3, wherein the KDF is not known to the HSM.

5. The method of claim 2, further comprising:

causing the database encryption key management system to determine that a third entity computing system has been whitelisted to use the transaction scheme; and causing the database encryption key management system to transmit the seed to a third entity computing system for derivation of the Tk by the third entity computing system based on the seed.

6. The method of claim 5, wherein the HMAC key cryptogram is accessible to the third entity computing system through a link comprising one of a URL and an IP address.

7. The method of claim 6, further comprising:

accessing the HMAC key cryptogram via the link;

determining whether the HMAC key cryptogram is valid; and based on a determination that the HMAC key cryptogram is valid, causing the database encryption key management system to transmit the link to the third entity computing system for derivation of the Tk by the third entity computing system based on the seed.

8. The method of claim 1, wherein the first entity computing system comprises an application deployed at least in part on one of a mobile device, an internet-of-things device, and an automated teller machine.

9. The method of claim 1, wherein the first entity computing system and the second entity computing system are structured to access a cloud-based service embodying at least one of the HSM and the database encryption key management system.

10. The method of claim 1, the unilateral transaction scheme being created unilaterally by the first entity computing system, generating the unilateral transaction scheme further comprising transmitting information related to the transaction scheme to the second entity computing system.

11. The method of claim 1, the bilaterally negotiated transaction scheme being created bilaterally by the first entity computing system and the second entity computing system, generating the bilaterally negotiated transaction scheme further comprising:

transmitting, by the first entity computing system, information related to the bilaterally negotiated transaction scheme to the second entity computing system; and receiving, by the first entity computing system, a confirmation from the second entity computing system that the bilaterally negotiated transaction scheme has been synchronized between the first entity computing system and the second entity computing system.

12. The method of claim 1, the Tk being unique to a particular transaction between the first entity computing system and the second entity computing system.

13. The method of claim 1, the Tk being unique to a particular communication session between the first entity computing system and the second entity computing system.

14. A first entity computing system comprising at least one processor and a memory storing computer-executable instructions thereon, the computer-executable instructions, when executed by the at least one processor, causing the first entity computing system to:

store a hash-based message authentication code (HMAC) key cryptogram in a non-volatile storage of the first entity computing system, the HMAC key cryptogram previously generated by a database encryption key management system associated with a hardware security module (HSM) and received by the first entity computing system from the HSM;

generate an asymmetric key pair comprising a public key and a private key;

store the public key in the non-volatile storage;

generate a transaction scheme, wherein the transaction scheme is one of a unilateral transaction scheme and a bilaterally negotiated transaction scheme; and transmit an electronic message to a second entity computing system, the electronic message cryptographically protected using a transaction key (Tk) of the transaction scheme.

15. The first entity computing system of claim 14, the computer-executable instructions, when executed by the at least one processor, causing the first entity computing system to:

transmit the HMAC key cryptogram, the transaction scheme, and the public key to the database encryption key management system;

receive a seed generated by the database encryption key management system based on the HMAC key cryptogram and the transaction scheme, the seed cryptographically protected by the database encryption key management system using the public key generated by the first entity computing system;

decrypt the seed; and based on the seed, derive the Tk;

the Tk not being stored in the non-volatile storage associated with the first entity computing system.

16. The first entity computing system of claim 15, the computer-executable instructions, when executed by the at least one processor, causing the first entity computing system to:

cause the database encryption key management system to determine that a third entity computing system has been whitelisted to use the transaction scheme; and cause the database encryption key management system to transmit the seed to a third entity computing system for derivation of the Tk by the third entity computing system based on the seed;

wherein the HMAC key cryptogram is accessible to the third entity computing system through a link comprising one of a URL and an IP address.

17. The first entity computing system of claim 16, the computer-executable instructions, when executed by the at least one processor, causing the first entity computing system to:

transmit information related to the transaction scheme to the second entity computing system; and receive a confirmation from the second entity computing system that the transaction scheme has been synchronized between the first entity computing system and the second entity computing system.

18. The first entity computing system of claim 14, wherein the first entity computing system comprises an application deployed at least in part on one of a mobile device, an internet-of-things device, and an automated teller machine.

19. The first entity computing system of claim 14, wherein the first entity computing system is structured to access a cloud-based service embodying at least one of the HSM and the database encryption key management system.

20. A non-transitory computer readable media having computer-executable instructions embodied therein that, when executed by a processor of a computing system, cause the computing system to perform operations comprising:

storing a hash-based message authentication code (HMAC) key cryptogram in a non-volatile storage of the computing system, the HMAC key cryptogram previously generated by a database encryption key management system associated with a hardware security module (HSM), the computing system communicatively coupled to the database encryption key management system via a secured connection;

generating an asymmetric key pair comprising a public key and a private key;

storing the public key in the non-volatile storage;

generating a transaction scheme, wherein the transaction scheme is one of a unilateral transaction scheme and a bilaterally negotiated transaction scheme;

transmitting the HMAC key cryptogram, the transaction scheme, and the public key to the database encryption key management system;

deriving a transaction key (Tk) based on seed received from the database encryption key management system via the secured connection, the seed generated based in part on the transaction scheme and the HMAC key cryptogram; and transmitting an electronic message to a remote computing system, the electronic message cryptographically protected using the Tk.

* * * * *